United States Patent
Fleizach et al.

(10) Patent No.: US 10,330,490 B2
(45) Date of Patent: Jun. 25, 2019

(54) TOUCH-BASED EXPLORATION OF MAPS FOR SCREEN READER USERS

(71) Applicant: Apple Inc., Cupertino, CA (US)

(72) Inventors: Christopher B. Fleizach, Morgan Hill, CA (US); Reginald D. Hudson, San Francisco, CA (US); Michael M. Pedersen, San Francisco, CA (US); Samuel C. White, San Jose, CA (US); Joel Lopes Da Silva, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/249,228

(22) Filed: Aug. 26, 2016

(65) Prior Publication Data

US 2017/0045372 A1 Feb. 16, 2017

Related U.S. Application Data

(63) Continuation of application No. 13/605,407, filed on Sep. 6, 2012, now Pat. No. 9,429,431.
(Continued)

(51) Int. Cl.
*G01C 21/36* (2006.01)
*G01C 21/20* (2006.01)
(Continued)

(52) U.S. Cl.
CPC ......... *G01C 21/3679* (2013.01); *G01C 21/20* (2013.01); *G01C 21/206* (2013.01);
(Continued)

(58) Field of Classification Search
CPC .. G01C 21/3679; G01C 21/206; G01C 21/34; G01C 21/20; G06F 3/167; G06F 3/016;
(Continued)

(56) References Cited

U.S. PATENT DOCUMENTS 5,470,233 A 11/1995 Fruchterman et al.
6,172,641 B1 1/2001 Millington
(Continued)

FOREIGN PATENT DOCUMENTS

EP 2 133 663 A1 12/2009

OTHER PUBLICATIONS

Purewal, "Two Google Apps Help Blind Navigate," PCWorld, http://www.techhive.com/article/207500/Two_Google_Apps_Help_Blind_Navigate.html, Oct. 12, 2010, 2 pages.
(Continued)

*Primary Examiner* — Nga X Nguyen
(74) *Attorney, Agent, or Firm* — Morgan, Lewis & Bockius LLP

(57) ABSTRACT

An electronic device can provide an interactive map with non-visual output, thereby making the map accessible to visually impaired users. The map can be based on a starting location defined based on a current location of the electronic device or on a location entered by the user. Nearby paths, nearby points of interest, or directions from the starting location to an ending location can be identified via audio output. Users can touch a screen of the electronic device in order to virtually explore a neighborhood. A user can be alerted when he is moving along or straying from a path, approaching an intersection or point of interest, or changing terrains. Thus, the user can familiarize himself with city-level spatial relationships without needing to physically explore unfamiliar surroundings.

72 Claims, 17 Drawing Sheets

Related U.S. Application Data

(60) Provisional application No. 61/657,245, filed on Jun. 8, 2012.

(51) Int. Cl.
*G06F 3/01* (2006.01)
*G06F 3/0488* (2013.01)
*G06F 3/16* (2006.01)
*G01C 21/34* (2006.01)

(52) U.S. Cl.
CPC .......... *G01C 21/34* (2013.01); *G01C 21/3697* (2013.01); *G06F 3/016* (2013.01); *G06F 3/04883* (2013.01); *G06F 3/167* (2013.01)

(58) Field of Classification Search
CPC ............ G06F 3/04883; G06F 17/3087; G06Q 30/0261; H04L 51/20; H04M 1/72572
See application file for complete search history.

(56) References Cited

U.S. PATENT DOCUMENTS

| | | | | |
|---|---|---|---|---|
| 6,401,027 | B1* | 6/2002 | Xu | G08G 1/0104 340/988 |
| 8,686,851 | B2* | 4/2014 | Davis | G01C 21/206 340/539.12 |
| 8,791,956 | B2 | 7/2014 | Ando et al. | |
| 2003/0179133 | A1 | 9/2003 | Pepin et al. | |
| 2007/0129883 | A1 | 6/2007 | Kuo et al. | |
| 2009/0005981 | A1 | 1/2009 | Forstall et al. | |
| 2011/0193795 | A1 | 8/2011 | Seidman et al. | |
| 2012/0303262 | A1* | 11/2012 | Alam | G01C 21/3415 701/410 |

OTHER PUBLICATIONS

Office Action, dated Sep. 11, 2014, received in U.S. Appl. No. 13/605,407, 12 pages.
Final Office Action, dated Feb. 12, 2015, received in U.S. Appl. No. 13/605,407, 14 pages.
Office Action, dated May 13, 2015, received in U.S. Appl. No. 13/605,407, 11 pages.
Final Office Action, dated Nov. 27, 2015, received in U.S. Appl. No. 13/605,407, 14 pages.
Notice of Allowance, dated Apr. 19, 2016, received in U.S. Appl. No. 13/605,407, 11 pages.
International Search Report and Written Opinion, dated Aug. 30, 2013, received in International Patent Application No. PCT/US2013/040633, which corresponds with U.S. Appl. No. 13/605,407, 10 pages.
International Preliminary Report on Patentability, dated Dec. 9, 2014, received in International Patent Application No. PCT/US2013/040633, which corresponds with U.S. Appl. No. 13/605,407, 7 pages.

* cited by examiner

TOUCH-BASED EXPLORATION OF MAPS FOR SCREEN READER USERS

CROSS-REFERENCE TO RELATED APPLICATIONS

This application is a continuation of U.S. Ser. No. 13/605,407, filed Sep. 6, 2012, which claims the benefit and priority of U.S. Provisional Application No. 61/657,245, filed on Jun. 8, 2012, which are hereby incorporated by reference in their entirety for all purposes.

BACKGROUND

The present disclosure relates generally to providing maps, via an electronic device with a touchscreen, that can be utilized by visually impaired users by, e.g., providing non-visual signals to indicate trajectories of paths and nearby points of interest.

Maps allow users to understand and adjust to unfamiliar areas. For example, a map that visually depicts roads' relative positions can enable a user to determine how to commute from a starting location to an ending location. Maps can also identify places that may be of interest to a user, such that a user can decide to travel to and stop at an identified place.

However, maps are typically two-dimensional and visual, thereby providing limited information to a visually-impaired user. The user's access to location information can be even more limited when the user is not looking for any particular information. For example, while directions from a specific starting point to a specific destination point can be spoken, it is difficult to concisely convey general spatial relationships within an area that have the potential of being of interest to the user. Thus, the user can find it difficult or impossible to obtain a general understanding of streets and places in an unfamiliar area, and the user can feel lost and confused in a new environment.

SUMMARY

Certain embodiments of the present invention provide maps that are presented using non-visual (e.g., audio or haptic) cues via electronic devices, such that a user is informed about a path's trajectory, where paths intersect, and/or where points of interests are located. For example, a map app can be provided via an electronic device. A geographic starting location can be a current location of the electronic device (e.g., determined via Global Positioning Satellite technology) or a location identified by a user (e.g., via a voice command). The geographic starting location can be associated with a point on a screen of the electronic device touched by the user. An area surrounding the geographic starting location can be identified. A user can be informed (e.g., via audio signals) of streets and/or points of interest near the geographic starting location. The user can then move his finger along a street, and feedback (e.g., audio cues) can indicate whether the user is beginning to veer off the street and can identify intersections and points of interest "near" the user's finger. Thus, the user can begin to appreciate a spatial layout of the area.

A user can further input a search query, such as a specific address or type of location (e.g., "library", "hospital", or "Starbucks"). The map app can identify a destination location in response to the search query and can indicate to the user how to move from the geographic starting location to the destination location. A first portion of the directions can be spoken. As the user's finger nears completion of the first portion of the directions, a next portion of the directions can be spoken. For example, the user can initially be directed to move south 1.5 miles. After the user's finger moves a corresponding distance along a corresponding direction on a screen of the electronic device, the user can be directed to move according to a subsequent direction. Thus, a user can understand how to move to the destination location without needing to actually embark on the commute.

City-level data is therefore provided to a visually impaired user such that he can gain an understanding of spatial properties within an area. User input can be used to repeatedly adjust a map's coverage and to determine what type of information to present to the user (e.g., nearby locations, directions or intersecting streets). Non-visual feedback not only can provide indications about nearby streets and locations but can also assist a user in understanding how to follow a street on the screen such that the user can understand a trajectory of the street.

These and other embodiments of the invention along with many of its advantages and features are described in more detail in conjunction with the text below and attached figures.

DETAILED DESCRIPTION

Certain embodiments of the present invention provide maps that are presented using non-visual (e.g., audio or haptic) cues via electronic devices, such that a user is informed about a path's trajectory, where paths intersect, and/or where points of interests are located. For example, a map app can be provided via an electronic device. A geographic starting location can be a current location of the electronic device (e.g., determined via Global Positioning Satellite technology) or a location identified by a user (e.g., via a voice command). The geographic starting location can be associated with a point on a screen of the electronic device touched by the user. An area surrounding the geographic starting location can be identified. A user can be informed (e.g., via audio signals) of streets and/or points of interest near the geographic starting location. The user can then move his finger along a street, and feedback (e.g., audio cues) can indicate whether the user is beginning to veer off the street and can identify intersections and points of interest "near" the user's finger. Thus, the user can begin to appreciate a spatial layout of the area.

A user can further input a search query, such as a specific address or type of location (e.g., "library", "hospital", or "Starbucks"). The map app can identify a destination location in response to the search query and can indicate to the user how to move from the geographic starting location to the destination location. A first portion of the directions can be spoken. As the user's finger nears completion of the first portion of the directions, a next portion of the directions can be spoken. For example, the user can initially be directed to move south 1.5 miles. After the user's finger moves a corresponding distance along a corresponding direction on a screen of the electronic device, the user can be directed to move according to a subsequent direction. Thus, a user can understand how to move to the destination location without needing to actually embark on the commute.

City-level data is therefore provided to a visually impaired user such that he can gain an understanding of spatial properties within an area. User input can be used to repeatedly adjust a map's coverage and to determine what type of information to present to the user (e.g., nearby locations, directions or intersecting streets). Non-visual feedback not only can provide indications about nearby streets and locations but can also assist a user in understanding how to follow a street on the screen such that the user can understand a trajectory of the street.

Figure 1:
FIG. 1 illustrates a system for providing map data to visually impaired users.

FIG. 1 illustrates a system 100 for providing map data to visually impaired users. In this example, a user 105 is walking on a sidewalk 110 near Broadway Street, and user 105 is carrying an electronic device 115. Electronic device 115 can include a mobile device, such as a phone, tablet computer, or laptop computer. For example, electronic device 115 can be an iPod®, iPhone®, or iPad® device available from Apple Inc. of Cupertino, Calif.

As described in greater detail below, electronic device 115 can include an input component (e.g., a touchscreen) configured to receive input from user 105. Electronic device 115 can also include an output component configured to provide output to user 105. The output component can include a component that can provide output even to visually impaired users 105. For example, electronic device 115 can include a motor that can provide vibration output and/or a speaker 120 that can provide audio output.

Electronic device 115 can provide information related to a geographic starting location, such as a current location of electronic device 115 or a location entered by user 105. For example, an exemplary audio signal 125 in FIG. 1 indicates that user 105 is currently at an address of 315 Broadway Street. Electronic device 115 can further provide information detailing how user 105 can interact with electronic device 115 in order to receive additional spatial information. For example, audio signal 125 in FIG. 1 indicates that user 105 can touch a screen of electronic device 115 for information about nearby locations. Further details about capabilities of electronic device 115 are provided below.

Figure 2:
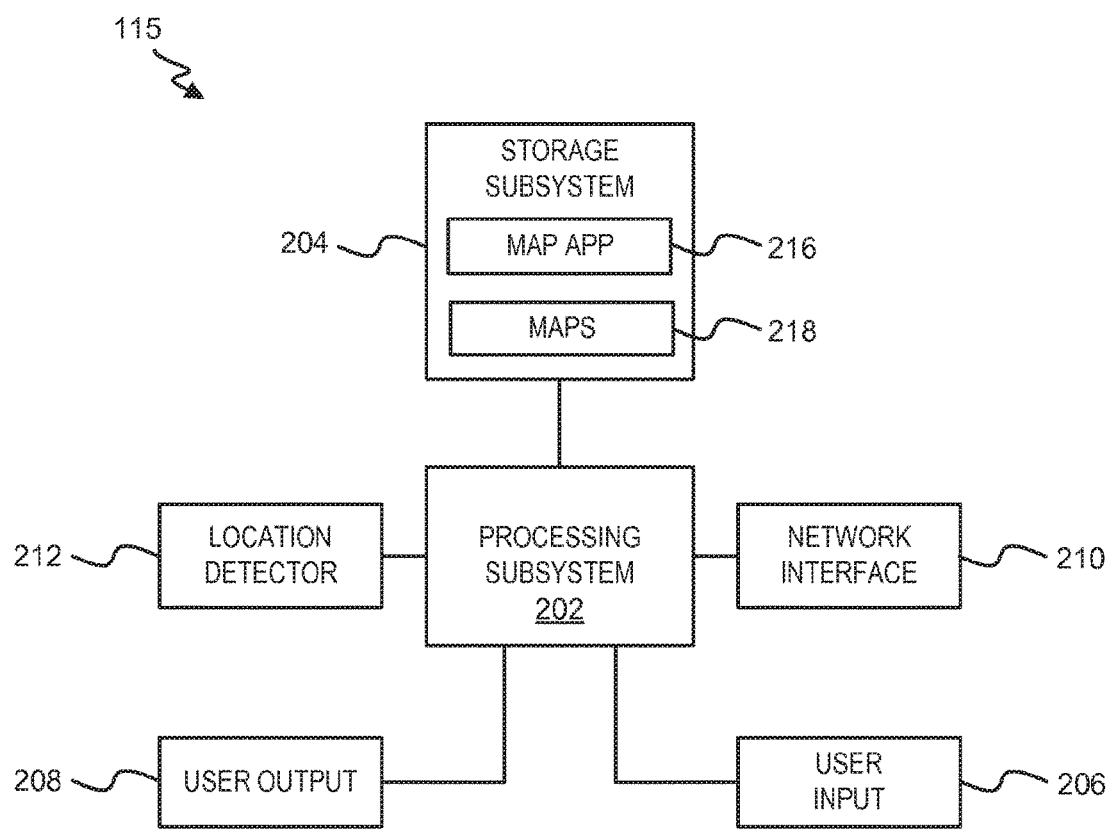
FIG. 2 is a simplified block diagram of an implementation of electronic device according to an embodiment of the present invention.

FIG. 2 is a simplified block diagram of an implementation of electronic device 115 according to an embodiment of the present invention. Electronic device 115 can be a mobile electronic device, such as a cellular phone, a smartphone, a tablet computer, or any device that a user is likely to carry while moving around and that is capable of executing a map app as described herein. Electronic device 115 can include a processing subsystem 202, a storage subsystem 204, a user input component 206, a user output component 208, a network interface 210, and a location detector 212.

Processing subsystem 202, which can be implemented as one or more integrated circuits (e.g., e.g., one or more single-core or multi-core microprocessors or microcontrollers), can control the operation of electronic device 115. In various embodiments, processing subsystem 202 can execute a variety of programs in response to program code and can maintain multiple concurrently executing programs or processes. At any given time, some or all of the program code to be executed can be resident in processing subsystem 202 and/or in storage subsystem 204.

Through suitable programming, processing subsystem 202 can provide various functionality for electronic device 115. For example, processing subsystem 202 can execute a map application program (or "app") 216. Map app 216 can provide various functionality such as determining a geographic starting location (e.g., by detecting a current location or analyzing user input), determining paths and points of interest within an area surrounding the geographic starting location, and/or providing non-visual feedback to user 105 to convey spatial information about the surrounding area.

Map app 216 can determine the area surrounding the starting location by accessing a maps database 218. Maps database 218 can be indexed using and/or can include geographic coordinates and/or street addresses. Maps database 218 can, e.g., associate point or area locations with a name of a place of interest and/or a terrain (e.g., street, grass or water). Maps database 218 can indicate locations of paths' trajectories and intersections. As used herein, a path can include a street (e.g., a highway, freeway, city street or road), a bicycle path, a public-transportation route, or a walking path (e.g., a sidewalk). It will be appreciated that disclosures herein that refer to a particular type of a path (e.g., a street) can be extended to include other types of paths. Maps database 218 can be based on third-party map data, developer-generated map data, and/or user-generated map data. For example, a user 105 can identify a geographic location and a name for a point of interest for himself or for all users.

Storage subsystem 204 can be implemented, e.g., using disk, flash memory, or any other storage media in any combination, and can include volatile and/or non-volatile storage as desired. In some embodiments, storage subsystem 204 can store one or more application programs to be executed by processing subsystem 202 (e.g., map app 216). In some embodiments, storage subsystem 204 can store other data (e.g., used by and/or defined by map app 216), such as maps database 218. Programs and/or data can be stored in non-volatile storage and copied in whole or in part to volatile working memory during program execution.

A user interface can be provided by one or more user input components 206 and one or more user output components 208. User input components 206 can include a touch pad, touch screen, scroll wheel, click wheel, dial, button, switch, keypad, microphone, or the like. User output components 208 can include a speaker, headphone jack, video screen, indicator light, weighted motor capable of producing vibration output, or the like, together with supporting electronics (e.g., digital-to-analog or analog-to-digital converters, signal processors, or the like). A user can operate input components 206 to invoke the functionality of electronic device 115 and can receive (e.g., view, hear and/or feel) output from electronic device 115 via output components 208.

Network interface 210 can provide voice and/or data communication capability for electronic device 115. In some embodiments network interface 210 can include radio frequency (RF) transceiver components for accessing wireless voice and/or data networks (e.g., using cellular telephone technology, advanced data network technology such as 3G, 4G or EDGE, WiFi (IEEE 802.11 family standards), or other mobile communication technologies, or any combination thereof), and/or other components. In some embodiments network interface 210 can provide wired network connectivity (e.g., Ethernet) in addition to or instead of a wireless interface. Network interface 210 can be implemented using a combination of hardware (e.g., antennas, modulators/demodulators, encoders/decoders, and other analog and/or digital signal processing circuits) and software components.

Location detector 212 can detect a past or current location of electronic device 115. For example, location detector 212 can include a Global Positioning Satellite (GPS) receiver that receives GPS signals identifying GPS satellites, a cell-tower detector that detects which cell tower or cell towers are carrying cellular communications associated with electronic device 115, and/or a WiFi detector that detects WiFi access points. Location detector 212 can estimate a distance between electronic device 115 and GPS satellites, cell towers and/or WiFi access points. Using the estimated distances and locations of the GPS satellites, cell towers and/or WiFi access points, location detector 212 can then estimate a position of electronic device 115. The estimated location can include, e.g., geographic coordinates or an address (e.g., a street number, street name, city and/or state).

Disclosures herein can refer to electronic device 115 as if it is capable of executing map app 216 by itself. It will be appreciated that, in some embodiments, electronic device 115 communicates with a remote server during an execution of map app 216 via network interface 210. The remote server can, e.g., process user inputs and/or can include maps database 218 (e.g., in addition to or instead of locally storing maps database 218 at electronic device 115).

It will be appreciated that electronic device 115 described herein is illustrative and that variations and modifications are possible. For example, electronic device can have other capabilities not specifically described herein (e.g., telephonic capabilities, power management, accessory connectivity, etc.). In a system with multiple electronic devices 115, different electronic devices 115 can have different sets of capabilities; the various electronic devices 115 can be but need not be similar or identical to each other.

Further, while electronic device 115 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. Additionally, while electronic device 115 is described as singular entities, it is to be understood that each can include multiple coupled entities.

Figure 3:
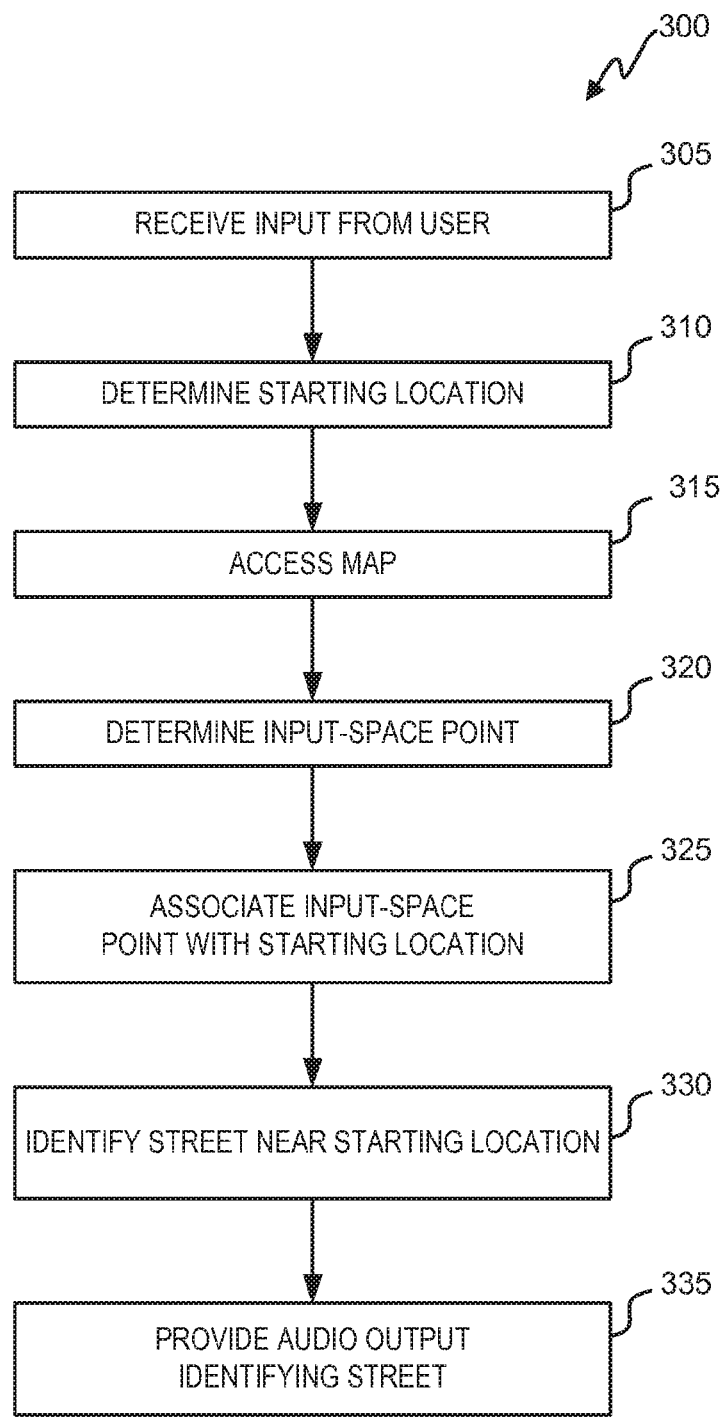
FIG. 3 is a flow diagram of a process for using an electronic device to non-visually convey map data to a user according to an embodiment of the present invention.

FIG. 3 is a flow diagram of a process 300 for using an electronic device to non-visually convey map data to a user according to an embodiment of the present invention. Process 300 can be implemented, e.g., in electronic device 115.

At block 305, input can be received from user 105 (e.g., via user input component 206). The input can include, e.g., opening map app 216, requesting a map to be rendered, entering a starting location, or requesting that a current location be detected. In some instances, the input can (e.g., additionally or alternatively) include a designation of an input-space starting point that user 105 wants to be associated with a geographic starting location. For example, user 105 can touch a screen of electronic device 115. As another example, user 105 can click on a mouse of electronic device 115.

At block 310, a geographic starting location can be determined. The starting location can include a current location of electronic device 115. The current location can be determined, e.g., via location detector 212, which can detect signals associated with GPS satellites, WiFi access points and/or cell towers that are relatively near electronic device 115 compared to other GPS satellites, WiFi access points and/or cell towers. The starting location can include a location identified by user 105 (e.g., via input received at block 305). For example, user 105 can speak an address (e.g., "1255 First Street, San Diego, Calif."). The audio signal from the user can be decoded to identify the address, and the address (or corresponding geographic coordinates) can be equated to the starting location. As another example, user 105 can speak a location type ("coffee shop"), e.g., at block 305. The audio signal can be decoded to identify the message, and one or more nearby locations matching the location type can be determined. In some instances, user 105 can select among multiple identified locations after multiple nearby locations are identified (e.g., audibly), and the selected location (or corresponding coordinates) is used as the starting location. In some embodiments, the user can specify a destination location in addition to or instead of a starting location.

At block 315, electronic map data can be accessed. The accessed map data can include data within maps database 218. The accessed data can correspond to an area near and/or surrounding the starting location. In some instances, the accessed data corresponds to an area between the starting location and a geographic destination location (e.g., identified by user 105). The accessed map data can indicate, e.g., absolute and/or relative locations of paths, points of interest and terrains. A geographic size corresponding to the accessed map data can depend on, e.g., default or set zoom parameters and/or a distance between the starting location and a destination location. For example, a default setting can indicate that the map data is to include data corresponding to a 1- by 2-mile rectangle centered on the starting location.

The accessed map data can include data not specific to user 105 and/or data that is specific to user 105. For example, a user 105 can indicate (via electronic device) that a particular address corresponds to "Home", or a learning algorithm within map app 216 can learn that another address corresponds to "Work". These addresses can be associated with the respective names specifically for user 105 and/or electronic device 115.

A map including some or all of the accessed electronic map data can be rendered on a touch screen. In some instances, a centering or offset of the rendered map can be determined based on a default parameter or setting. For example, the map can be rendered such that a starting location is routinely presented at a fixed input-space point (e.g., a center of the rendered map). In some instances, a centering or offset of the rendered map depends on dynamic user input. For example, a user can touch the touch screen (e.g., at block 305), and an input-space point defined based on the user's touch can be associated with the starting point.

At block 320, an input-space point can be determined. In some instances, the input-space point can be determined based on a default parameter or a setting (e.g., a default setting or user setting) that defines a fixed input-space point to be associated with starting locations. For example, starting locations can be consistently associated with an input-space point at a center of a display. In some instances, the input-space point can be determined based on the input received at block 305. For example, the input-space point can be defined based on, e.g., a screen location touched by user 105 or a cursor's position when user 105 clicked a mouse.

At block 325, the input-space point can be associated with the geographic starting location. Thus, in some instances, geographic starting locations can be associated with a single (and, e.g., fixed) input-space point. In some instances, no matter where a user touches a screen, that input-space point can be associated with the starting location.

At block 330, a street near the geographic starting location can be identified. The street can include, e.g., a street of the starting location (e.g., "First Street" when the starting location is "e.g., "1255 First Street, San Diego, Calif."). In some instances, a relationship between the street and the starting location is also identified. For example, the identified street can include a street intersecting with a street of the starting location and a distance between the starting location and the intersection (e.g., "Broadway intersection in 0.3 miles"). As another example, the identified street can include a nearest street or cross street and a distance between the starting location and the nearest street (e.g., "Garden Street 0.1 miles south" when a user is in a nearby park).

At block 340, audio output can be provided that identifies the street. The audio output can include, e.g., a name of the street, a distance (e.g., a directional distance) to the street, and/or a direction of the street (e.g., "First Street—running North to South). The audio output can include words or non-word output (e.g., an audio signal indicating that a map has been generated based on a current location).

Figure 4A:
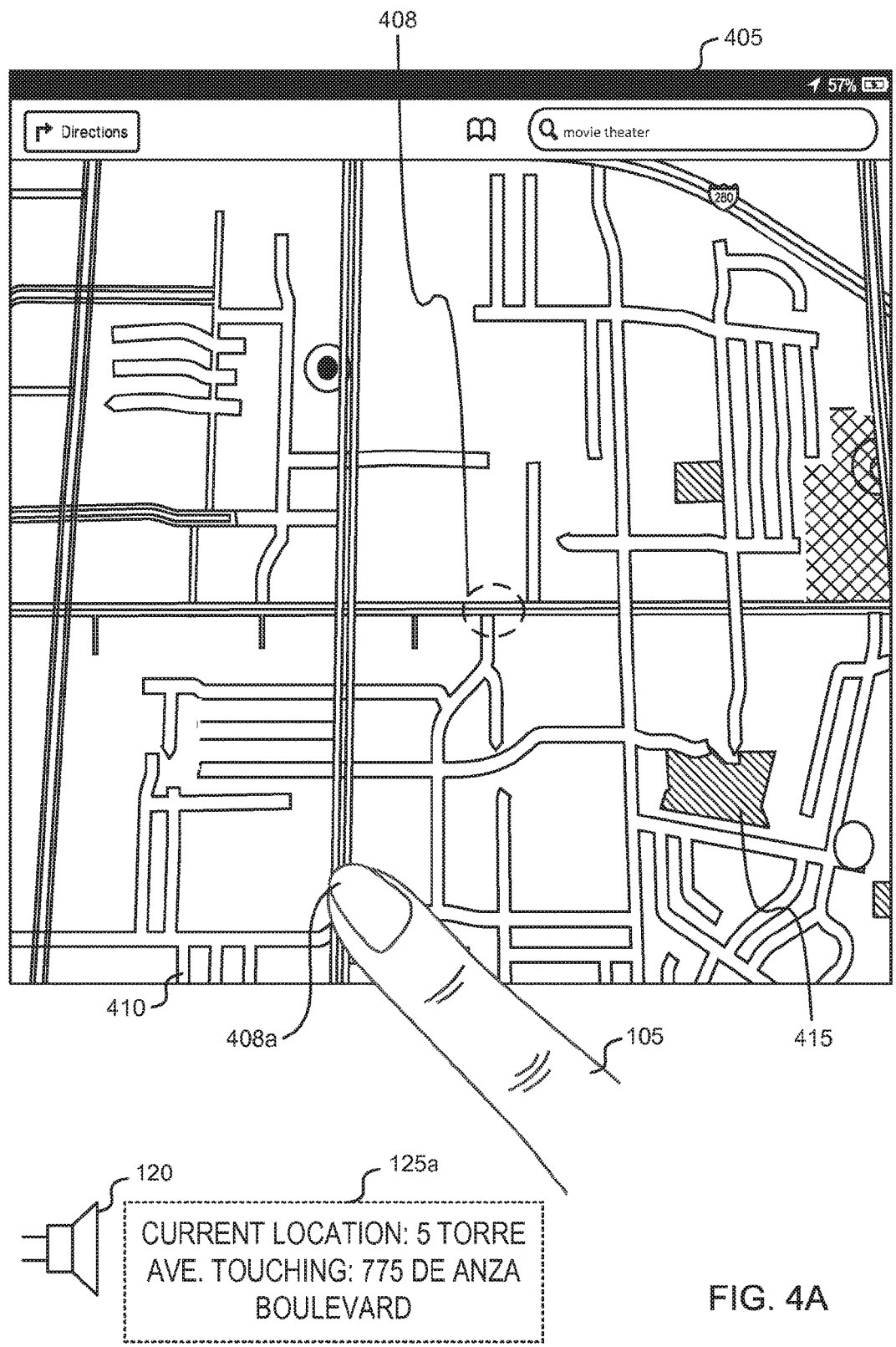
FIGS. 4A-4B illustrate examples of a map that can be displayed during operation of a map app according to an embodiment of the invention.

FIG. 4A illustrates an example of a map 405 that can be displayed during operation of map app 216 in accordance with process 300 according to an embodiment of the invention. User 105 can open map app 216 and/or request that map app 216 render a map near a current location. Electronic device 115 can determine a current location of electronic device 115 and define a starting location as the current location. The current location can be identified to user 105, e.g., via an audio signal 125a provided via a speaker 120 of electronic device 115.

A map 405 can be generated to identify paths and points of interest near the current location. Map 405 can be presented on a screen of electronic device 115. Map 405 can be scaled, such that a relatively large geographic area is represented using a smaller input space (e.g., corresponding to a screen size). While map app 216 can be tailored towards users with visual impairments, such users can still have some visual capabilities. Further, some non-visually impaired people can also use map app 216. Thus, providing some visual information be helpful. Visual properties of map 405 (e.g., borders, colors, and/or line thicknesses) can be tailored to improve the probability that a visually impaired user can distinguish features of map 405.

Map 405 can include a current-location marking 408 that visually identifies the current location. Current-location marking 408 can be routinely positioned at a default position (e.g., a screen center). In some instances, user 105 can adjust the default position and/or can move map 405 such that current-location marking 408 is also moved away from the default position.

Map 405 includes a set of paths 410, such as highways, city streets and roads. Each path 410 can be associated with a name and a trajectory. Path trajectories can indicate where a first path intersects with other paths. In FIG. 4A, each path 410 is surrounded by a dark border to improve the visibility of the path.

Map 405 can further include points of interest 415. Some points of interest 415 can be initially apparent on the map 405 (e.g., visually represented, such as green patches for parks) and/or non-visually identified to user 105 upon satisfaction of a location-based criterion. Other points of interest 415 require that a user search for the point of interest before it is visually or non-visually identified (e.g., identifying "Joe's coffee house" only after a user searches for "coffee shops"). As will be further detailed below, user 105 can interact with map 405 (via electronic device 115) in order to understand spatial properties of an area surrounding him.

User 105 can touch a point in the map. The point can be defined based on an input-space point. A geographic location associated with the input-space point can be identified to the user, e.g., via audio signal 125a.

Figure 4B:
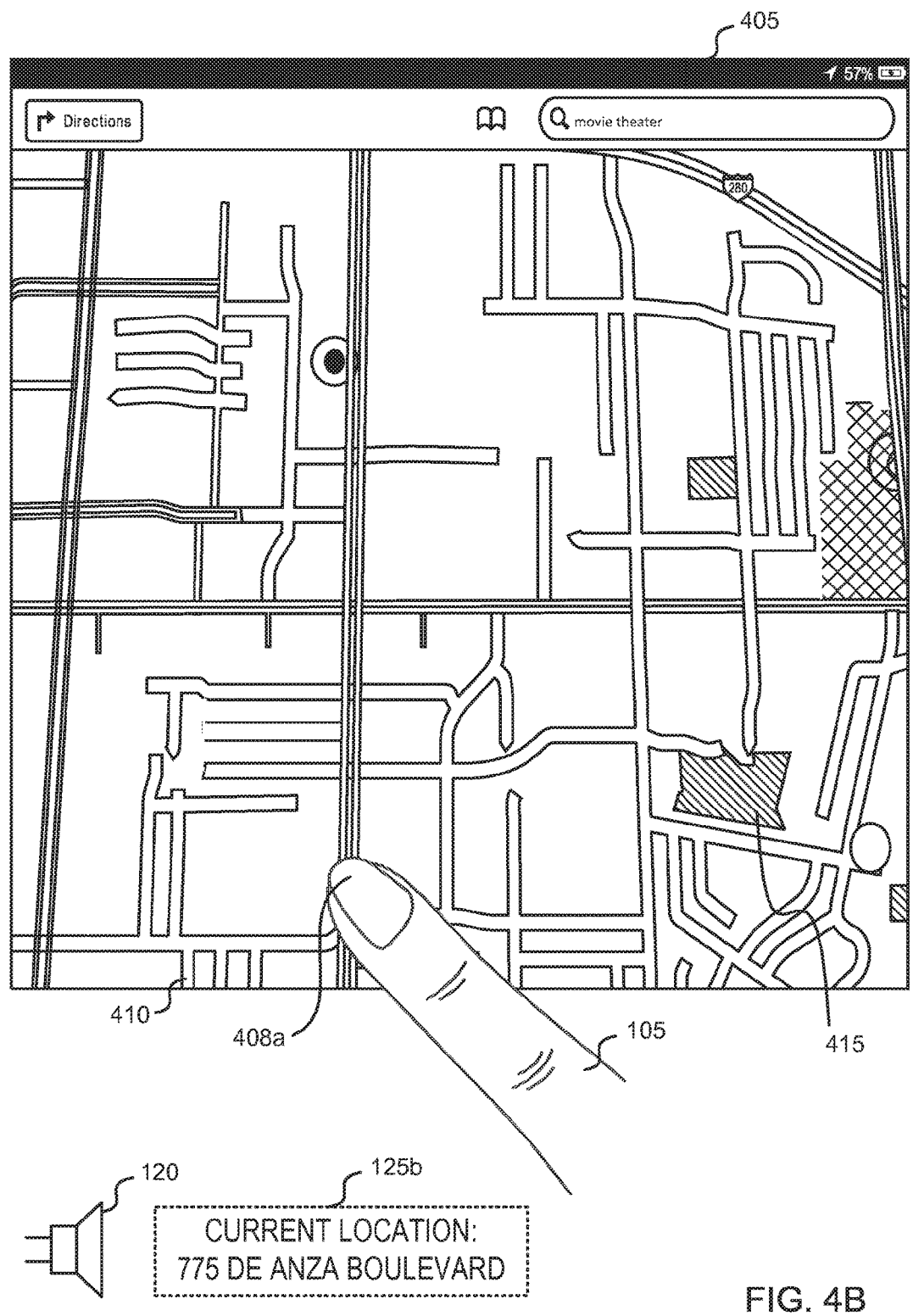

FIG. 4B illustrates another example of a map 405 that can be displayed during operation of map app 216 in accordance with process 300 according to an embodiment of the invention. In this instance, the starting location is not associated with a fixed or default input-space point. Rather, the input-space point associated with the starting location is determined based on real-time user input.

User 105 can touch a screen of electronic device 115 at a screen position 408a. Upon detecting the touch, electronic device 115 can determine a current location of electronic device 115 and define a starting location as the current location. The current location can be identified to user 105, e.g., via an audio signal 125b provided via a speaker 120 of electronic device 115. The touched portion of the screen can be associated with the starting location, and a map 405 can be generated to identify paths and points of interest near the current location.

It will be appreciated that process 300 and the illustration provided in FIGS. 4A-4B are exemplary and that modifications are contemplated. For example, a current location can be repeatedly detected irrespective of a user's input, and a starting location can be determined based on a most recently determined current location. As another example, the audio output can include information other than identifying a nearby street (e.g., a nearby point of interest or geographic coordinates).

Once a map has been displayed, a user can interact with the map, e.g., by tracing a finger along a path, such as a road.

Figure 5:
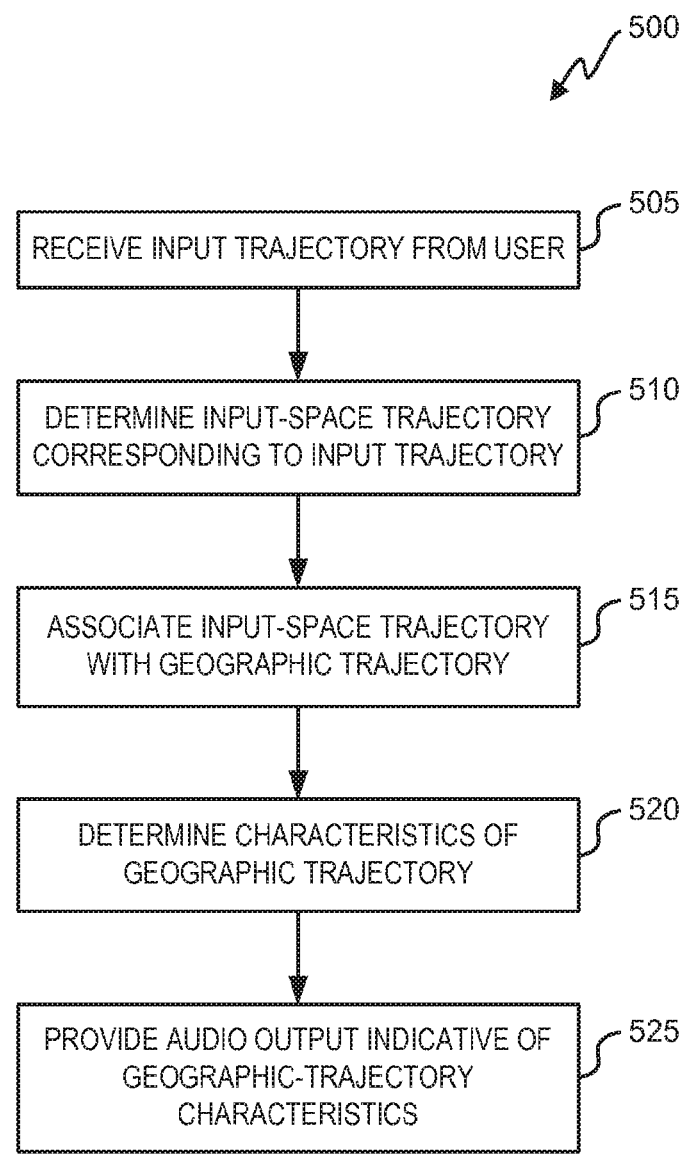
FIG. 5 is a flow diagram of a process for using an electronic device to non-visually convey map data to a user according to an embodiment of the present invention.

FIG. 5 is a flow diagram of a process 500 for using an electronic device to non-visually and interactively convey map data to a user according to an embodiment of the present invention. Process 300 can be implemented, e.g., in electronic device 115.

At block 505, an input trajectory can be received from user 105 interacting with map app 216. For example, user 105 can slide his finger from a first point on a screen of electronic device 215 (which can be showing a map such as map 405 shown in FIGS. 4A-4B.) to a second point on the screen.

At block 510, an input-space trajectory corresponding to the input trajectory can be determined. For example, each point along a screen of electronic device 215 can be defined as an input-space point (e.g., with an origin point being located at a center or corner of the screen). The input-space trajectory can include, e.g., a set of input-space points or a formula characterizing the input-space trajectory.

At block 515, the input-space trajectory can be associated with a geographic trajectory based on a currently presented map. In one instance, the input-space trajectory is associated with a geographic trajectory including geographic coordinates. For example, an input-space trajectory including a set of input-space points can be associated with a set of geographic coordinates.

The geographic trajectory can be determined, e.g., based on scaling and/or offset factors associated with a presented map 405. In some instances, the geographic trajectory is defined to begin at a geographic starting location, and one or more scaling factors are applied to movements within the input-space trajectory to determine subsequent points along the geographic trajectory.

At block 520, characteristics of the geographic trajectory can be determined. The determined characteristics can include a direction and/or magnitude associated with the geographic trajectory. The determined characteristics can include characteristics tied to a path and/or point of interest. For example, the determined characteristics can indicate whether the geographic trajectory is continuing along a path, veering away from a path, and/or nearing a point of interest.

At block 525, audio output indicative of the geographic-trajectory characteristics can be provided. The audio output can include, e.g., a direction, a distance (e.g., "2 miles from starting location" or "1 mile Southeast from home"), a name of a street ("approaching Broadway"), a name of a point of interest ("pool on your left"), and/or an indication as to whether the geographic trajectory is following another trajectory (e.g., of a path or route between locations). The audio output can include words or non-word output. For example, electronic device 115 can produce an audio signal that mimics or evokes the sound of footsteps as the user movers his finger, and the pitch or frequency of that sound can indicate an extent to which an input trajectory is following a trajectory of a path or route and/or can convey a speed at which the user is drawing the trajectory (e.g., faster steps being associated with fast input trajectories).

Figure 6:
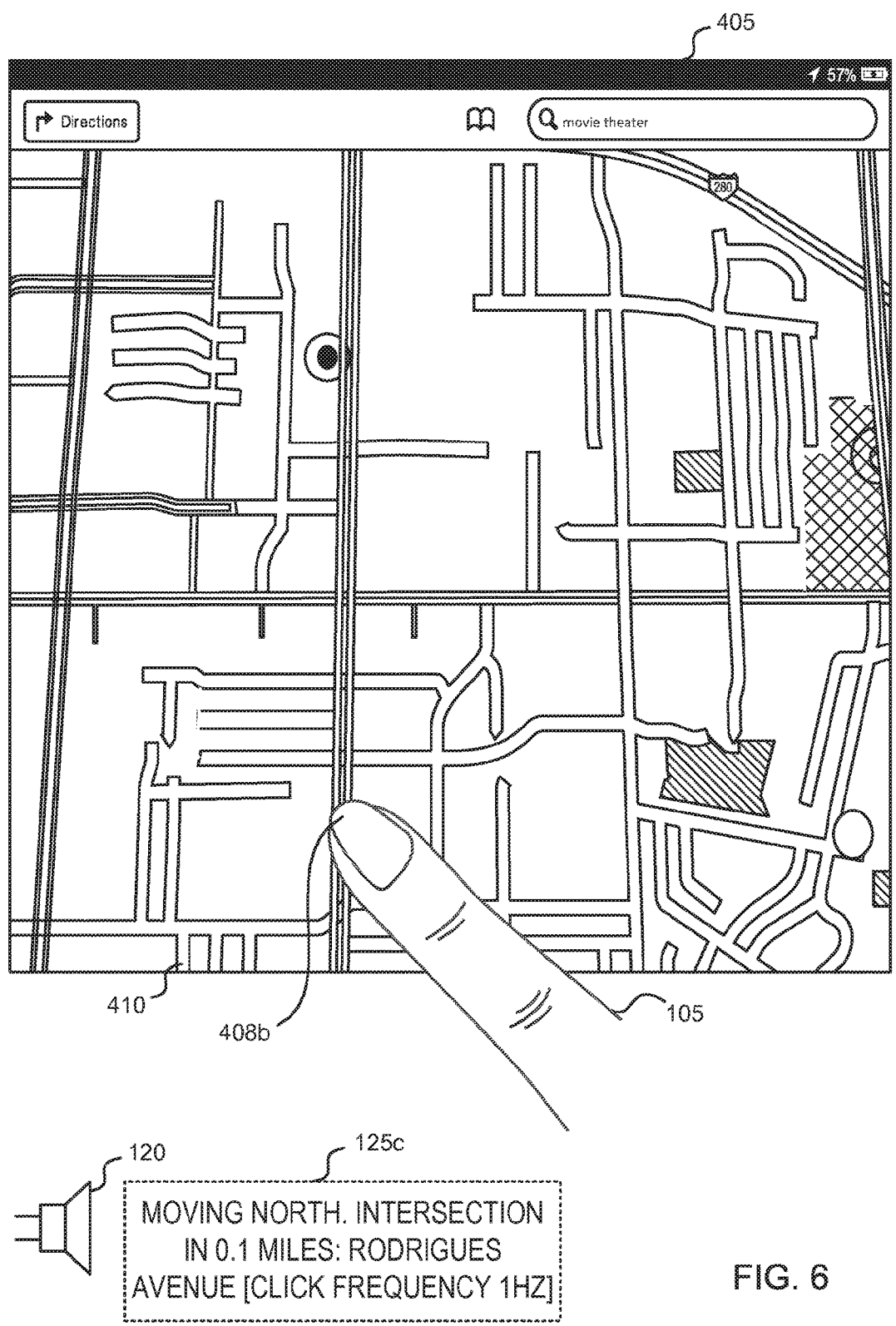
FIGS. 6 and 7 illustrate examples of a map that can be displayed during operation of a map app according to an embodiment of the invention.
Figure 7:
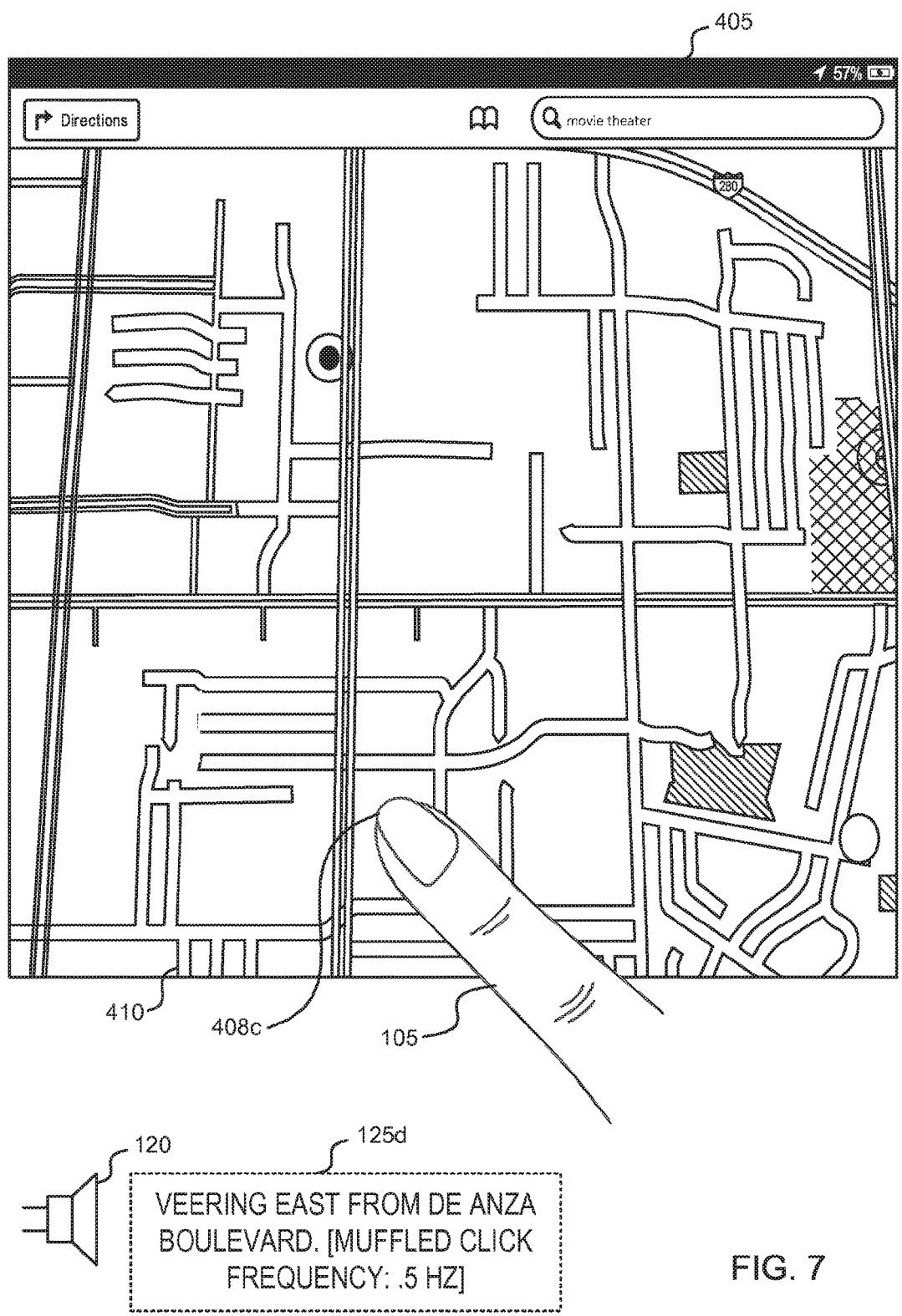

FIGS. 6 and 7 illustrate examples of a map 405 that can be displayed during operation of map app 216 in accordance with process 500 according to an embodiment of the invention. In FIG. 6, user 105 has moved his finger upwards from screen position 408a (shown in FIG. 4) to screen position 408b (shown in FIG. 6). In FIG. 7, user 105 has moved his finger upwards and to the right from screen position 408a (shown in FIG. 4) to screen position 408c (shown in FIG. 7). Each movement can define an input-space trajectory (from a first point associated with screen position 408a to a second point associated with screen position 408b or a third point associated with screen position 408c).

The input-space trajectory can be associated with a geographic trajectory. In FIG. 6, for example, the input-space trajectory corresponds to an upward movement along De Anza Boulevard. Assuming that the upwards direction corresponds to northward movement, the input-space trajectory corresponds to northward movement along De Anza Boulevard. The motion could also be associated with a distance (e.g., a 0.2 mile northward movement along De Anza Boulevard).

As user 105 moves along the input trajectory (and thus along a virtual geographic trajectory), new paths and points of interest become nearby. Therefore, upcoming intersections, nearby paths and nearby points of interest can be determined based on a point (e.g., a current point) in the input trajectory and/or a direction of the trajectory (to determine a direction associated with "upcoming" locations). In some instances, an upcoming intersection is automatically announced (e.g., when the intersection becomes less than a threshold distance away from a current point). In some instances, an upcoming intersection is announced after detecting particular input. The input can include verbal or gesture-based input. For example, a user can be tracking a north-south road. The user can quickly flick his finger (e.g., generally or in a particular direction). After detecting the input, an intersection can be identified (e.g., a next intersection along the road in a current tracking direction or a next intersection along the road in a direction associated with the flicking input). The identified intersection can be announced to a user. In some instances, a user can continue to flick his finger, such that other intersections are subsequently announced. Thus, a user can navigate through a web of connected streets by using directional gestures (e.g., flicking up for an identification of an upward intersection, flicking left for an identification of a leftward intersection, etc.).

Characteristics of the geographic trajectory can be identified to user 105, e.g., via an audio signal 125 provided via a speaker 120 of electronic device 115. For example, in FIG. 6, an audio signal 125c indicates that the input trajectory is associated with a northward movement. Further, audio signal 125c identifies an upcoming intersection. Specifically, audio signal 125c indicates that the intersection with Rodrigues Avenue is 0.1 mile away. The 0.1 mile can be determined by associating an input space for map 405 with a geographic space and associating screen position 408b with an input-space point. In one instance, streets within map 405 can be associated with input-space points, and an input-space distance between an upcoming street and an input-space point can be converted to a geographic distance. In another instance, the input-space point associated with screen position 408b can be converted to a geographic point, streets can further be associated with geographic points, and a distance between an upcoming street and the geographic point associated with the screen position 408b can be determined.

Audio signal 125 can include non-word sounds. In FIG. 6, audio signal 125c includes a clicking sound that clicks at a 1-Hertz frequency. Characteristics of the click (e.g., a particular sound, pitch and/or frequency) can indicate, e.g., a speed associated with the input trajectory, a terrain associated with a position along a trajectory, and/or whether the input trajectory is tracking a trajectory of a path. For example, a sound of footsteps on concrete can be used when an input point coincides with a road, a sound of footsteps splashing through water can be used when an input point coincides with water terrain, a sound of footsteps through grass can be used when an input point coincides with a park, and a sound of footsteps in a building can be used when an input point coincides with a building. In FIG. 6, the click sound and frequency can indicate that the input trajectory is successfully tracking De Anza Boulevard, such that the finger of user 105 remains on this path as it moves.

Properties of non-word sounds (e.g., pitch and frequency) can by dynamically and/or continuously adjusted based on a user's instantaneous interaction with the app and/or based on a user's past interactions with the app. In some instances, properties are adjusted such that transitions between sounds with different properties are smoothed. For example, if a user is tracking a road but starts moving into a park, a click sound can be produced by mixing a first sound of footsteps on concrete with a second sound of footsteps on grass. The contribution of the first sound relative to the second sound can depend on how far the user has departed from the road. In some instances, properties of non-word sounds depend on a user's distance or interaction with a particular feature being tracked. For example, if a user is tracking a road, sound properties can be adjusted based on how far the user's tracking departs from the road.

FIG. 7 illustrates an instance in which the input trajectory is not tracking De Anza Boulevard. Specifically, user 105 began (at location 408a) on De Anza Boulevard and subsequently moved up and right. Meanwhile, De Anza Boulevard runs up and down, not right. Thus, screen position 408c is to the right of De Anza Boulevard. Audio output can provide feedback identifying this result. For example, an audio signal 125d, in FIG. 7, can indicate that user 105 is veering east from De Anza Boulevard using spoken words. Additionally, a change in the click's sound, pitch and/or frequency can indicate a similar result. For example, the click sound can be indicative of a terrain. In FIG. 7, the click sound is muffled (unlike FIG. 6), which can convey that user 105 is no longer "on" a road. Further, the click frequency is reduced. The click frequency can, e.g., indicate an extent to which a user is tracking a road. Thus, a user can attempt to follow a road by attempting to maintain a desired type of audio signal (e.g., attempting to maintain a strong-click signal at a relatively high frequency).

Figure 8:
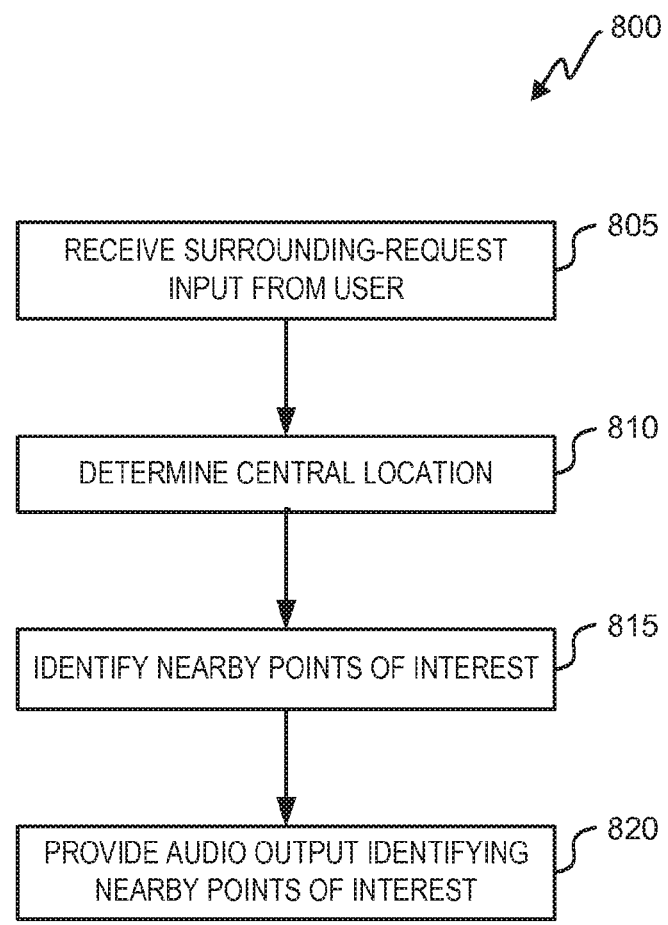
FIG. 8 is a flow diagram of a process for using an electronic device to non-visually convey map data to a user according to an embodiment of the present invention.

Once a map has been displayed, a user can also interact with the map to request identification of nearby points of interest. FIG. 8 is a flow diagram of a process 800 for using an electronic device to non-visually convey map data to a user according to an embodiment of the present invention. Process 800 can be implemented, e.g., in electronic device 115.

At block 805, a surrounding-request input from user 105 can be received. The surrounding-request input can indicate that user 105 is requesting information about points of interest surrounding and/or near a central location. The input can include, e.g., a tap on a screen of electronic device 115 or a keystroke.

At block 810, the central location can be determined. The central location can include an input-space location or a geographic location. The central location can include a current location of electronic device 115, a location recently entered by user 105, or a location associated with the input. For example, a map can be generated and presented on a screen of electronic device 115. A user can tap on the screen, and the tap can be associated with a geographic central location based on the map.

At block 815, points of interest near the central location can be identified. The points of interest can include non-commercial and/or commercial locations, such as parks, pools, city attractions, hospitals, airports, public-transportation stops, universities, schools, restaurants, or stores. The points of interest can be user-specific of general across users. For example, map app 216 can determine or learn that user 105 likes to learn about locations of coffee shops and Italian restaurants. Thus, these types of points of interested can be preferentially identified to user 105. Preferential identification can include, e.g., identifying locations within an expanded radius or identifying the locations first relative to other points of interest.

At block 820, audio output that identifies the nearby points of interest can be provided to user 105. For each point of interest, the audio output can indicate, e.g., its name, absolute location (e.g., street address), and/or relative location (e.g., from the central location). Points of interest can be presented in an order dependent on, e.g., a distance separating the point of interest from the central location, the type of point of interest, a popularity of the point of interest, and/or a preferential identification associated with the point of interest.

Figure 9:
FIG. 9 illustrates an example of operation of map app to identify nearby points of interest according to an embodiment of the invention.

FIG. 9 illustrates an example of operation of map app 216 to identify nearby points of interest in accordance with process 800 according to an embodiment of the invention. User 105 can tap a screen of electronic device 115 at a screen position 408d. Upon detecting the tap, electronic device 115 can determine that user 105 is requesting information about points of interest surrounding a central location.

In this instance, the central location can be defined as a current location of electronic device 115. The current location of electronic device 115 can further be associated with an input-space point associated with the tap. Thus, map 405 can be generated by associating the input-space point with a geographic location of the current location and determining streets and points of interest in an area around the geographic location of the current location.

In FIG. 9, the central location is near a point of interest 415 that is a pool. An audio signal 125e is thus provided to inform user 105 of the nearby pool. In this instance, the name of the pool and a distance separating user 105 from the point of interest is further identified.

In some instances, map app 216 can operate in a tour-guide mode. In this mode, user 105 can move his finger along an input-space trajectory, and electronic device 115 can repeatedly and/or continuously identify points of interest (and, in some instances, paths) near a geographic location associated with a current input-space point along the trajectory.

Figure 10:
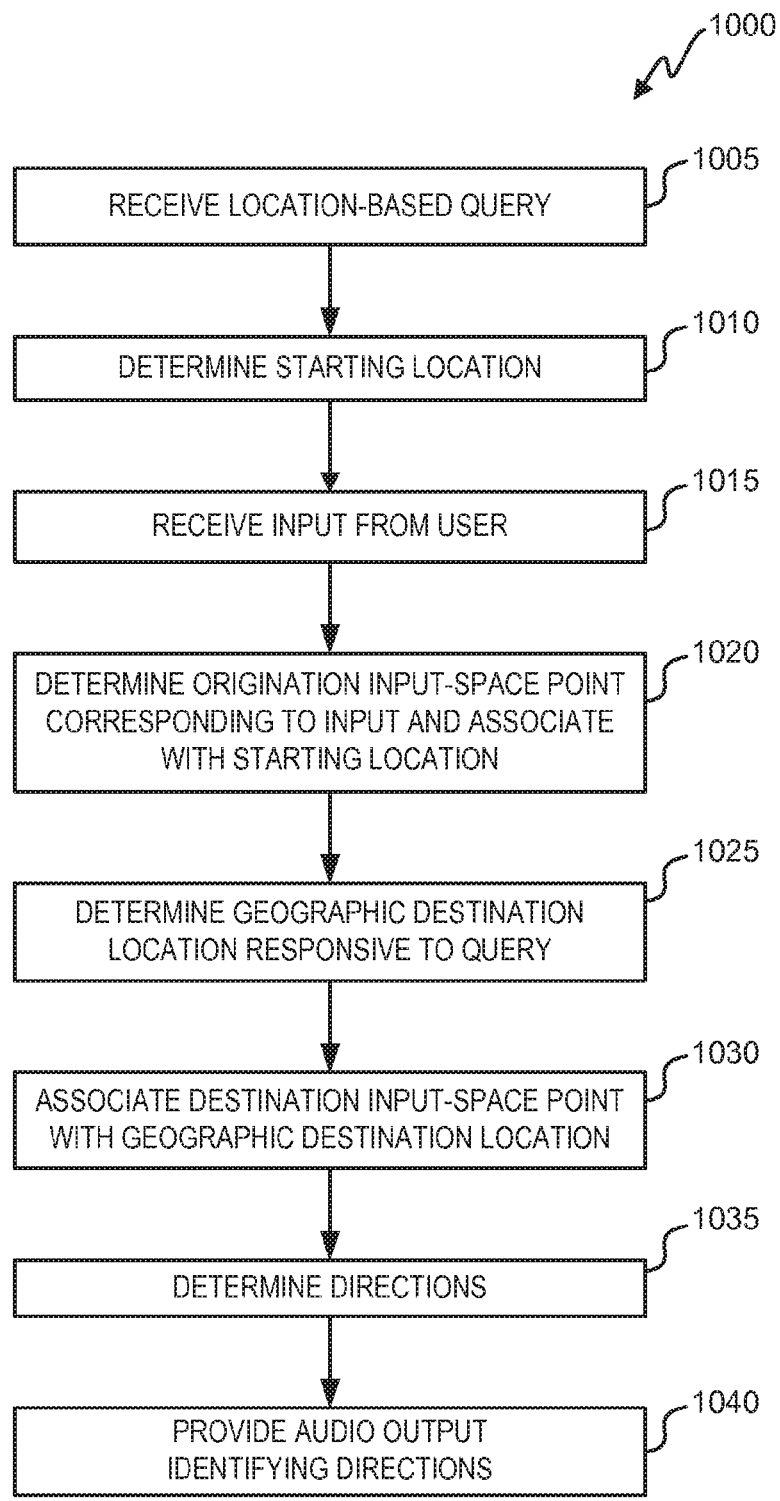
FIG. 10 is a flow diagram of a process for using an electronic device to non-visually convey directions between geographic locations to a user according to an embodiment of the present invention.

FIG. 10 is a flow diagram of a process 1000 for using an electronic device to non-visually convey directions between geographic locations to a user according to an embodiment of the present invention. Process 1000 can be implemented, e.g., in electronic device 115.

At block 1005, a location-based query can be received from user 105. For example, user 105 can speak the query, a microphone within electronic device 115 can detect the speech, and a speech detector can determine the spoken words. The location-based query can include a specific address or type of location (e.g., "deli").

At block 1010, a starting location can be determined. The starting location can include, e.g., a current location of electronic device 115 or a location identified by user 105 (e.g., "Going from Home to 415 Walnut Street").

At block 1015, input can be received from user 105. The input can include, e.g., touching a screen of electronic device 115. The input can indicate that a user would like for directions to be provided at a current time and/or that a location associated with the input (e.g., a touched location on a screen or cursor position) is to be associated with the starting location.

At block 1020, an origination input-space point can be determined based on the input and can be associated with the starting location. For example, the origination input-space point can correspond to a point on a screen touched by user 105.

At block 1025, a geographic destination location responsive to the location-based query can be determined. For example, if a user identifies an address, a geographic location (e.g., geographic coordinates) associated with the address can be equated to the geographic destination location. In some instances, a user identifies a type of location. Thus, block 1025 can include determining nearby locations of the identified type. If multiple locations of the identified type are identified, a single destination location can be, e.g., automatically selected by electronic device 115 (e.g., selecting the closest location) or the multiple locations can be presented to user 105 such that he can choose the destination location.

At block 1030, the geographic destination location can be associated with a destination input-space point. The destination input-space point can be determined based on the origination input-space point, a directional distance between the origination input-space point and the destination input-space point and/or a size of a screen of device 115.

At block 1035, directions can be determined. The directions can include directions between the origination input-space point and the destination input-space point and/or directions between the geographic starting location and the geographic destination location. The directions can be determined based on a map from map database 218. The directions can include, e.g., directions for a vehicle, public-transportation directions or pedestrian directions. The directions can include street names, distances, and turning directions.

At block 1040, audio output identifying the directions can be provided. In some instances, all directions are immediately provided. In some instances, directions are successively provided as user 105 moves his finger along a screen of device 115. Thus, a single direction (e.g., "Move south 1.5 miles") can be provided a time, and the directions can be adjusted if a user strays from a route. In some instances, the directions are successively provided as a user 105 physically moves. Thus, a user's location can be repeatedly tracked and directions can be adjusted based on his current location.

In some instances, the directions can be stored. A user 105 can then be able to repeatedly access the directions to hear them in part or in their entirety. In some instances, a geographic destination location identified in response to a search query is stored. User 105 can name the stored location and can specifically recall the location (e.g., to generate directions from a new starting location), or the stored location can be identified as a new and/or preferential point of interest.

Figure 11A:
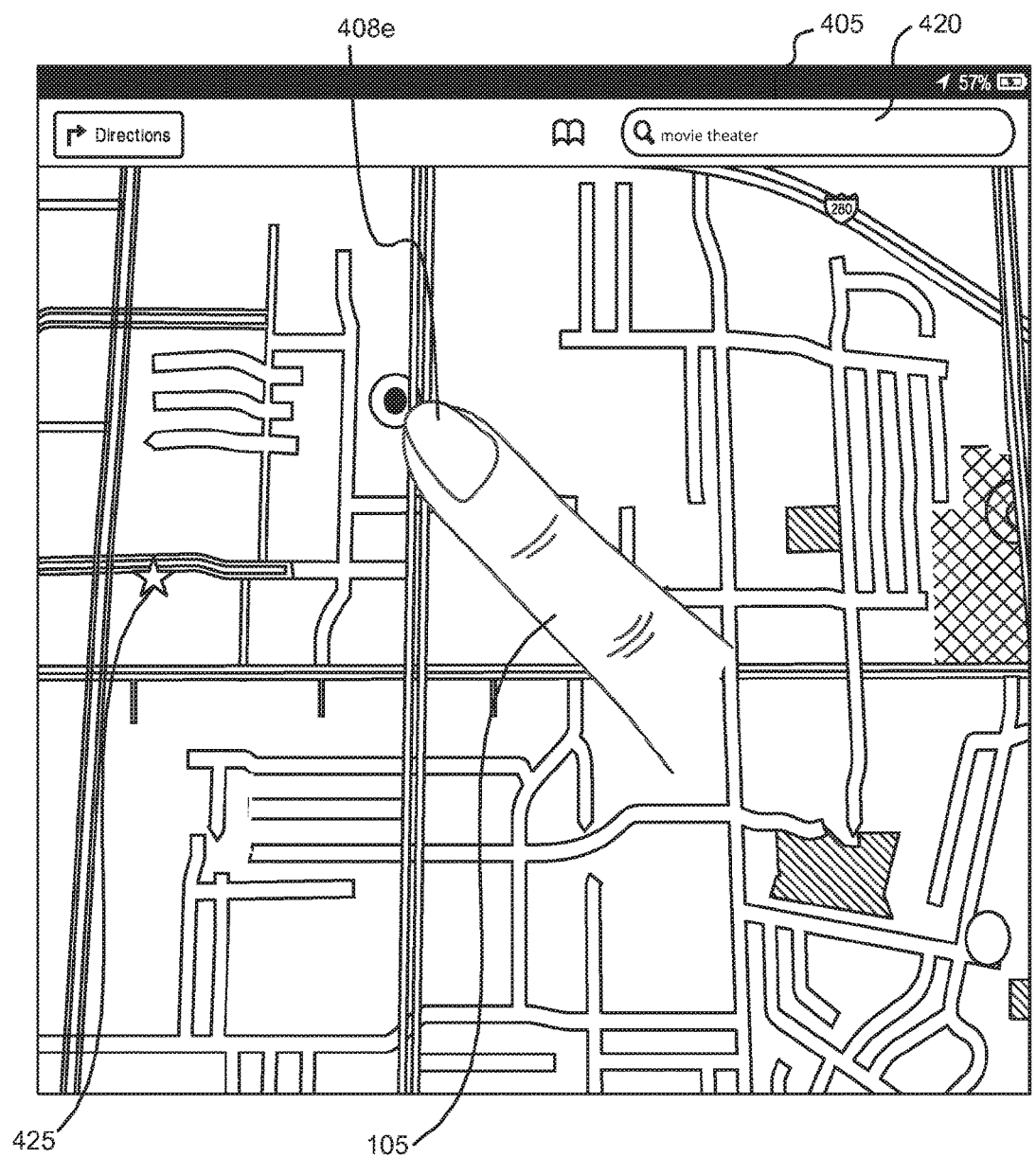
FIGS. 11A-11B illustrate an example of using map app to non-visually convey directions according to an embodiment of the invention.
Figure 11A:
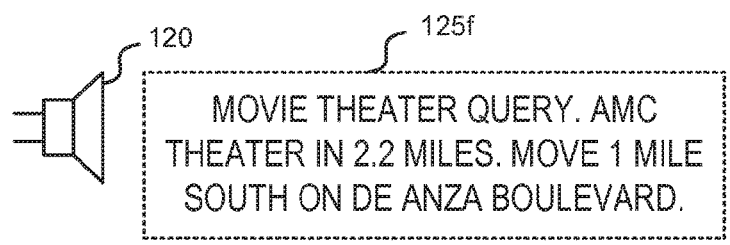
Figure 11B:
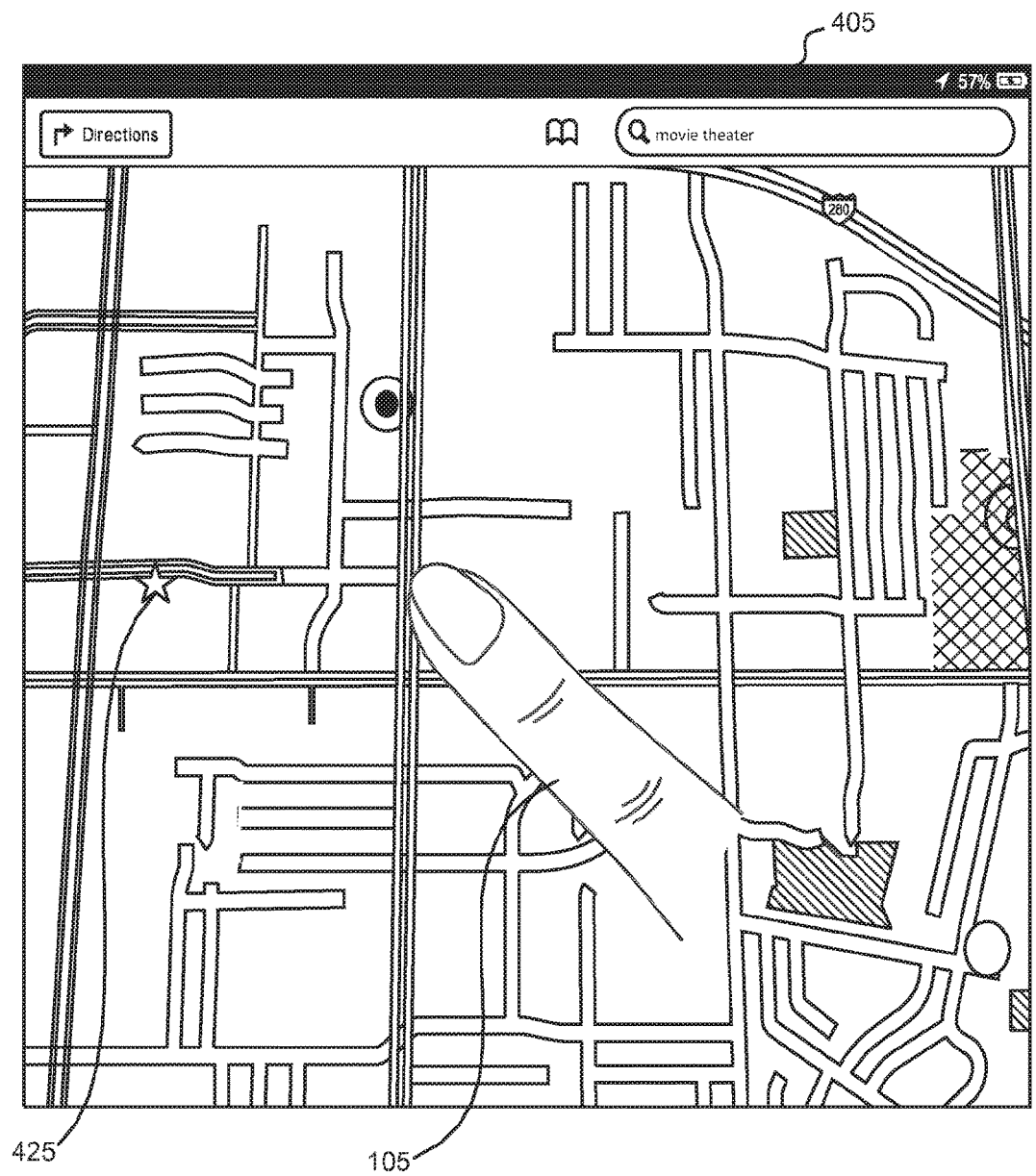
Figure 11B:
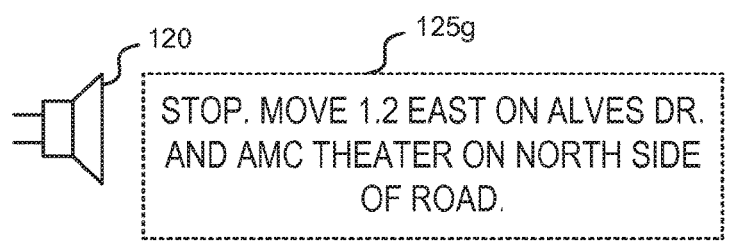

FIGS. 11A-11B illustrate an example of using map app 216 to non-visually convey directions in accordance with process 1000 according to an embodiment of the invention. User 105 can input a search query, which in this instance was "movie theater". For example, user 105 can speak the query into a microphone of electronic device 115, and a speech-detection component can detect the speech and identify the spoken words. The words can then appear within a search-query box 420.

User 105 can touch a screen of device 115 at a screen location 408e. Upon detecting the touch, electronic device 115 can determine a current location of electronic device 115. The current location can be associated with an input-space point associated with screen location 408e. A geographic starting location can also be equated to the current location.

Device 115 can search for nearby movie theaters. The closest theater can be identified to user 105, e.g., via an audio signal 125 provided by speaker 120. In this instance, an AMC theater is 2.2 miles from a current location. Map 405 can be generated such that both the starting location and the identified AMC-theater location can be presented. The identified AMC-theater location can be represented by a visual icon, such as a star 425. In some instances, map 405 is generated in order to otherwise increase or maximize an input-space distance between the starting location and the identified location.

Device 115 can determine directions between the starting location and the identified AMC-theater location. In this instance, both geographic directions and input-space directions are determined. Thus, device 115 can audibly indicate geographic directions, and user 105 can also attempt to follow the directions on the map using feedback based on input-space directions. For example, an audio signal 125f can identify a first direction of "Move 1 mile south on De Anza Boulevard." User 105 can thus move his finger down a screen of device 115. As shown in FIG. 11B, upon detecting that the user has completed the input-space equivalent of the one-mile movement, an audio signal 125g can direct the user to stop, turn West and travel 1.2 miles along Alves Drive. Thus, a user can familiarize himself with a route and can compare routes to different locations.

Figure 12:
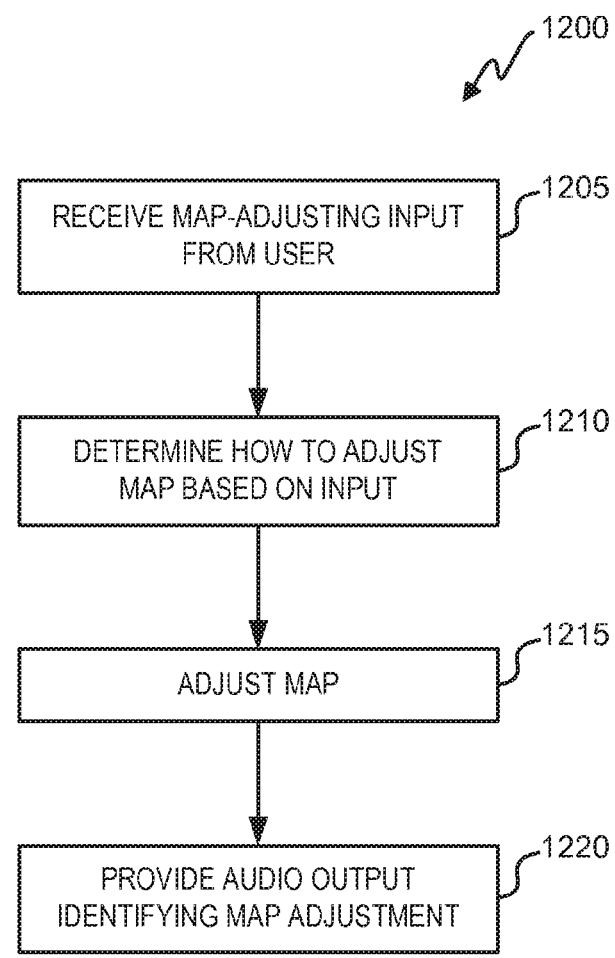
FIG. 12 is a flow diagram of a process for using an electronic device to adjust a map presented via a map app based on user input according to an embodiment of the present invention.

A user can interact with a displayed map by adjusting map presentation characteristics, e.g., by zooming into or out of the map, rotating the map or translationally moving the move. FIG. 12 is a flow diagram of a process 1200 for using an electronic device to adjust a map presented via map app 216 based on user input according to an embodiment of the present invention. Process 1200 can be implemented, e.g., in electronic device 115.

At block 1205, map-adjusting input can be received from user 105. The map-adjusting input can include a voice command or a gesture command. For example, the map-adjusting input can include a voice command to "Rotate map", to "Scroll map upwards", or to "Zoom in on map". In some instances, the map-adjusting input can include input received via a touchscreen. For example, the map-adjusting input can include rotation input, in which a user rapidly rotates his finger in a small clockwise or counterclockwise circle. The map-adjusting input can include touch input received from one or multiple fingers, such as one or two fingers touching a screen and moving closer together, moving further apart, moving up in tandem, or moving down in tandem.

At block 1210, it can be determined how to adjust a map based on the map-adjusting input. The map can include a map generated, e.g., based on previous user input. For example, the map can include a map generated to display a current location of electronic device 115, points of interest surrounding a starting location, or a starting and ending location determined based on a search query.

The determination can be based on the type of input received and/or other input characteristics (e.g., spoken magnitudes or magnitudes of inputs). For example, a verbal instruction to "rotate map" can be associated with a clockwise rotation of a map, or touchscreen clockwise rotation input can be associated with a clockwise rotation of the map. A verbal instruction to "zoom out of map" or an input in which two fingers touch the screen and move closer together can be associated with zooming out of the map. A verbal instruction to "move northward on map" or an input in which one or two fingers touch the screen and move downwards in tandem could be associated with moving the map downwards (e.g., such that a top portion of a screen displays portions of the map not previously visible).

In some instances, each map-adjusting input is associated with a defined adjustment magnitude. For example, each rotation input can be associated with a 90-degree rotation, or each zoom input could be associated with a defined step (e.g., to move to a next zoom value along a discrete scale or to scale a current zoom by a fixed value). Thus, e.g., a user can achieve a dramatic adjustment by repeating the map-adjusting input. In some instances, inputs can indicate an adjustment magnitude. For example, a verbal input could indicate "move map upwards by 2 miles" or "move map upwards by 4 steps", or fast or large touchscreen inputs can be associated with strong map adjustments.

At block 1215, the map can be adjusted in accordance with the determination. At block 1220, audio output can be provided to identify the map adjustment. The audio output can include word or non-word audio output. For example, the audio output can include a pitch slide, swish sound or verbal recount of the adjustment. The audio output can also include geographic characteristics about the map, as adjusted, such as streets located physically above a starting point in the input space, points of interest within a new field of view, or a number of streets within a new field of view.

Figure 13A:
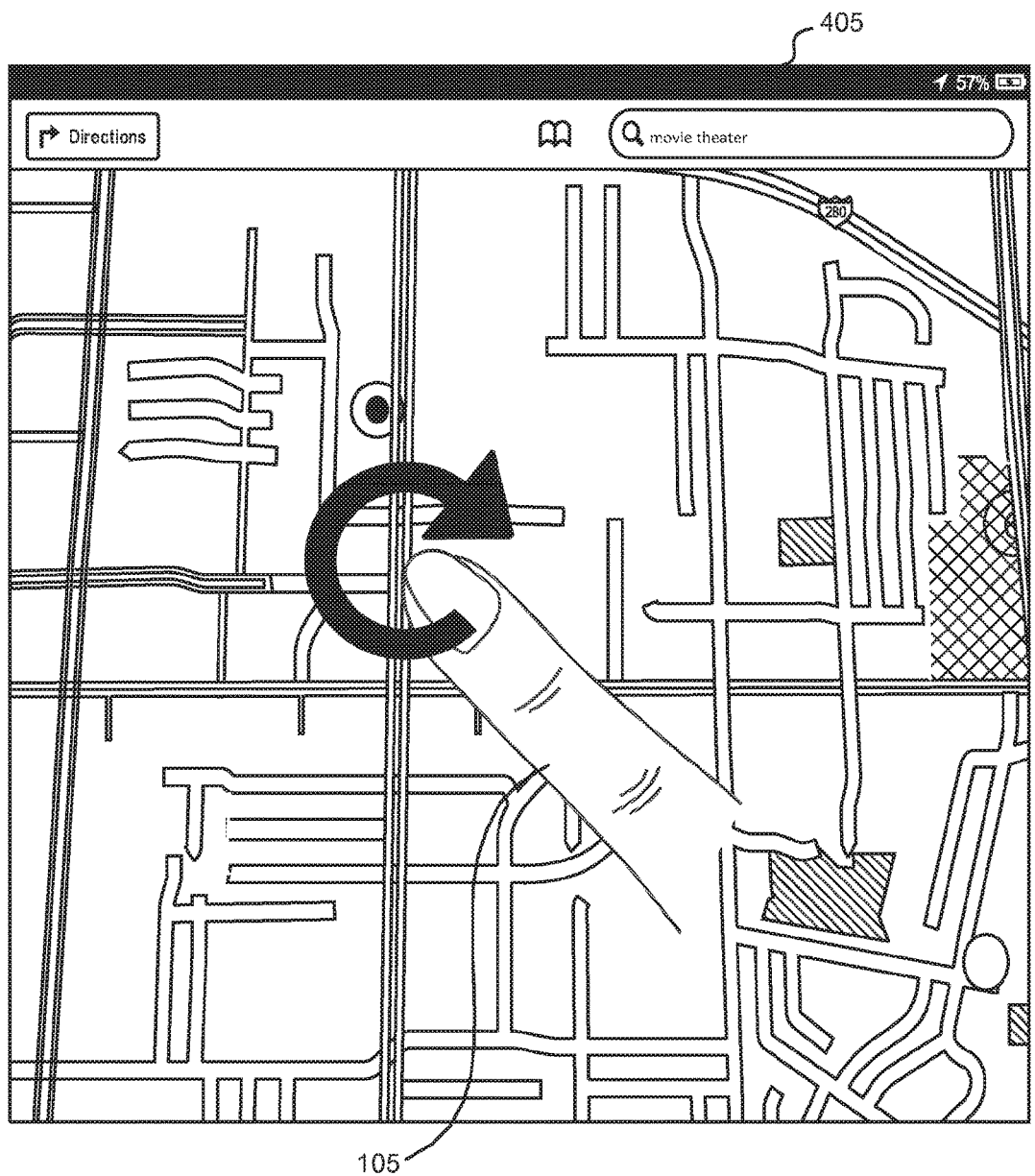
FIGS. 13A-13B illustrate an example of an adjustment of a map that can be made during operation of a map app according to an embodiment of the invention.
Figure 13A:
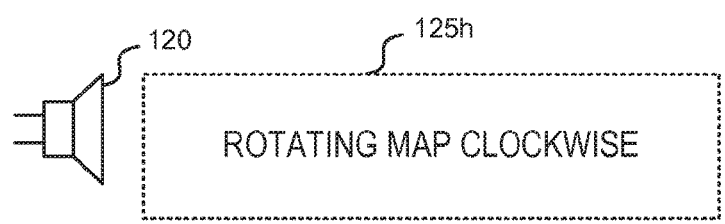
Figure 13B:
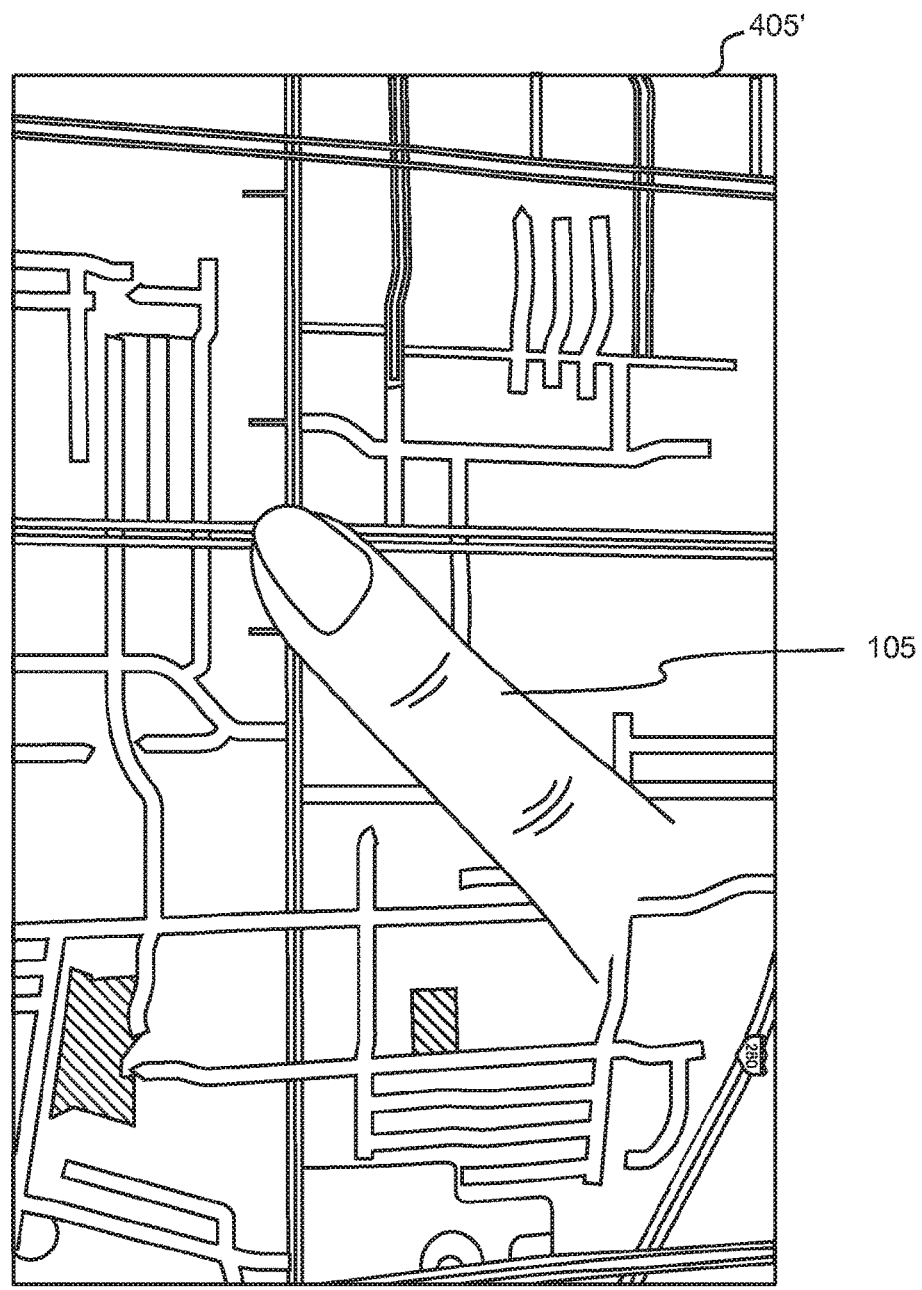
Figure 13B:
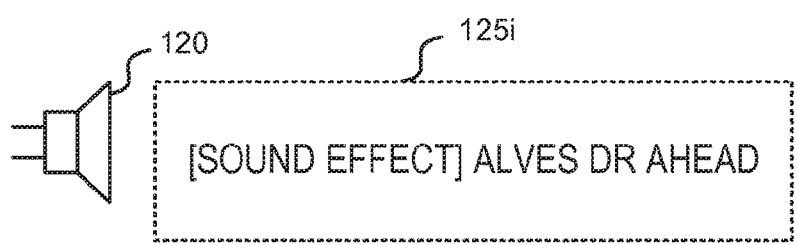

FIGS. 13A-13B illustrate an example of an adjustment of a map that can be made during operation of map app 216 in accordance with process 1200 according to an embodiment of the invention. User 105 can touch a screen of device 115 rotate his finger in a clockwise direction (or speak a verbal rotation command, such as "Rotate map clockwise"). Upon detecting the input, electronic device 115 can adjust map 405 such that it is rotated 90 degrees in a clockwise direction. The adjustment can be identified to user 105, e.g., via an audio signal 125*h* provided via a speaker 120 of electronic device 115, as illustrated in FIG. 13A.

FIG. 13B shows a map 405' following the rotation. In the original map 405, De Anza Boulevard was above the user's finger. In the adjusted map 405', Alves Drive (previously to the left of the user's finger) is above the user's finger. An audio signal 125*i* can include a sound effect that indicates that the map has been rotated and can identify a street "ahead" in the adjusted map 405. By using the rotation input, a user can quickly identify streets at an intersection and can adjust the map to orient in a direction intuitive to the user (e.g., based on a direction that user 105 is currently facing).

In some embodiments, other events can precipitate map adjustments. The other events can even include a lack of action. For example, after a user virtually arrives at an intersection (e.g., such that the intersection is announced), if the user pauses at the intersection (e.g., such that no new finger movements or oral commands are made), this pause can result in a map rotation. For example, an audio output can announce an intersection (e.g., "At intersection with Main Street, east-west road"), can announce map-adjustment instructions (e.g., "Pause to start tracking Main Street"), and can respond to a user's respective actions accordingly (e.g., following a pause, announcing "Now tracking Main Street"). In some instances, tracking a new street can also cause a map rotation, such that the newly tracked street is oriented in a particular direction (e.g., oriented vertically on a screen). For example, in some instances, the map rotation shown in FIGS. 13A-13B can occur following a user's pause at the intersection rather than following a user's rotation input. In some instances, a new street can be tracked, and a map orientation can remain unchanged.

Figure 14:
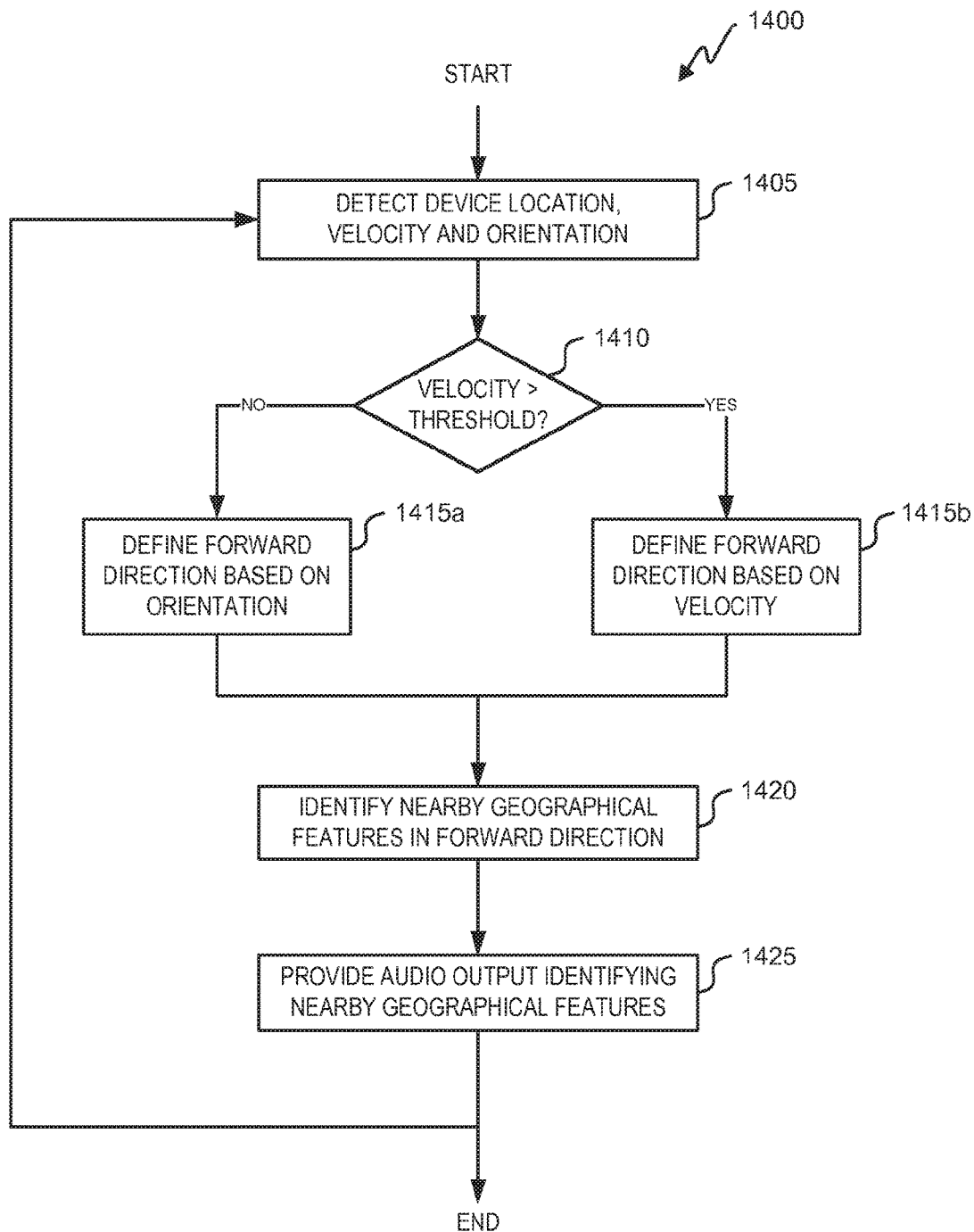
FIG. 14 is a flow diagram of a process for using an electronic device to automatically and repeatedly track a device and identify nearby geographical features.

In some instances, a device can be automatically tracked, and a map app can serve as a tour guide, identifying nearby geographical features (e.g., streets, intersections or locations of interest). FIG. 14 is a flow diagram of a process 1400 for using an electronic device to automatically and repeatedly track a device and identify nearby geographical features. Process 1400 can be implemented, e.g., in electronic device 115. Process 1400 can be automatically performed or performed after a user has requested a function associated with process 1400 (e.g., after a user has selected a "tour guide" mode).

At block 1405, a device's location, velocity and orientation can be detected. The location, velocity and orientation can be detected, e.g., based on measurements collected by location detector 212 and/or one or more other sensors in the device (e.g., a compass and/or accelerometer).

At block 1410, a determination can be made as to whether the velocity exceeds a threshold. The threshold can be set to a value that indicates that the device is likely in a moving vehicle if the threshold is exceeded (e.g., 5, 10 or 20 miles per hour).

If the threshold is not exceeded, at block 1415, a forward direction can be defined based on the detected orientation of the device (e.g., a direction that a vector extending from a bottom to a top of a device is pointing). Thus, e.g., a user can point a device towards geographical features interest. The direction can include a two- or three-dimensional direction. A two-directional direction can ignore an elevation-related component of the direction.

If the threshold is not exceeded, at block 1420, a forward direction can be defined based on the detected velocity of the device (e.g., a direction of a detected velocity vector). Therefore, e.g., if a user is in a moving vehicle, it can be assumed that the user is interested in geographical features in front of the vehicle irrespective of direction that the user is facing or that the device is facing. As specific illustrations, if a user is sitting sideways on a bus or if a user places a device sideways on a passenger seat while driving, the forward direction will continue to be defined based on the direction of movement of the vehicle.

At block 1420, nearby geographical features in the forward direction can be identified. The geographical features can include streets, intersections, and/or locations of interest. In some instances, a user can set a type of geographical feature (e.g., intersections, restaurants, or attractions) to be identified. The geographical features can be identified by projecting a location based on the device's location and the forward direction. The projected location can include a point location, a set of point locations, a range of locations or an area. Geographical features at the projected location can be identified based on a cached map, providing for efficient identifications.

The projected location can include a location that is a projection distance from the detected device's location (along the forward direction) or locations within projection distance range (defined by a minimum projection distance and a maximum projection distance) from the detected device's location (along the forward direction). It will be appreciated that the projected location can also include locations not directly along the forward direction; an orthogonal distance can define how far a projected location can extend in a direction orthogonal to the forward direction, or a projected-location radius can define a radius around a projected location to be considered. A projection distance, a minimum projection distance, a maximum projection distance, an orthogonal distance and/or a projected-location radius can be fixed or dynamic. In some dynamic instances, the distance can, e.g., depend on the detected device's velocity, such that larger distances are defined when the device is moving at faster speeds. In some dynamic instances, the distance can, e.g., depend on whether geographical features are identified at a first projected location; if not, the projected location can be moved or extended.

At block 1425, an audio output identifying the geographical features can be provided. In some instances, audio output is only provided if geographical features are identified as being at a projected location, at projected location. Process 1400 can then return to block 1405. The process can be continuously repeated or repeated at regular intervals. It will be appreciated that forward-direction definitions can change upon repetitions of process 1400. For example, if a device is in a taxi that it driving above the threshold speed, the forward direction can be defined based on the velocity. However, subsequently, if the taxi is stopped at a red light, the forward direction can be defined based on the device orientation. Thus, a user can at this point aim the device around an intersection to gain familiarity of his surroundings. The process can terminate, e.g., when a user exits a mode corresponding to process 1400.

Process 1400 shows an instance in which a forward-direction definition is conditioned upon a velocity-analysis determination performed at block 1410. It will be appreciated that, in some instances, different conditions can be implemented (e.g., defining the forward direction based on orientation based on whether a change in the device's orientation exceeded a threshold) or that the condition can be eliminated (e.g., always defining the forward direction based on the device's orientation or always defining the forward direction based on the device's velocity).

It will be appreciated that disclosures provided herein are exemplary and various modifications are contemplated. For example, disclosures that refer to audio outputs can be adapted to include other types of outputs suitable for visually impaired users. Alternative outputs can include vibration cues or pronounced visual feedback. As another example, disclosures that refer to inputs of a particular type can be adapted to include other types of inputs. Verbal inputs or gesture-based inputs can be used instead of touch-based inputs, and gesture-based or touch-based inputs can be used instead of verbal inputs. Disclosures herein that refer to inputs received directly at an electronic device can be extended to include inputs received via an accessory connected to the electronic device (e.g., a keyboard connected to a tablet computer).

Further, disclosures herein can be applied to indoor environments as well as outdoor environments. For example, a map could identify offices, rooms (e.g., conference rooms, or auditoriums), and restrooms within an office building, or a map could identify stores, shops, and restrooms within a shopping mall. Paths can include hallways, e.g., connecting stores or connecting rooms. Points of interest can include specific stores, meeting rooms, elevators, escalators, or restrooms. Thus, e.g., if a user can touch a map of a shopping mall, and an input-space point can be determined based on the where the user touched the map. A store point-of-interest associated with the input-space point or near the input-space point can be identified to the user.

Embodiments described herein can provide, via an electronic device, an interactive map accessible to visually impaired users. The map can be based on a starting location defined as current location of the electronic device or on a location entered by the user. Nearby paths, nearby points of interest, or directions from the starting location to an ending location can be identified via audio output. Users can touch a screen of the electronic device in order to virtually explore a neighborhood. A user can be alerted, e.g., by audio feedback, when he is moving along or straying from a path, approaching an intersection or point of interest, or changing terrains. Thus, the user can familiarize himself with city-level spatial relationships without needing to physically explore unfamiliar surroundings.

Portions of the description can refer to particular user interfaces, such as touchscreen displays. Other embodiments can use different interfaces. For example, a user interface can be voice-based, with the user speaking instructions into a microphone or other audio input device and the device providing an audible response (e.g., using synthesized speech or pre-recorded audio clips). A combination of voice-based and visual interface elements can be used, and in some embodiments, multiple different types of interfaces can be supported, with the user having the option to select a desired interface, to use multiple interfaces in combination (e.g., reading information from the screen and speaking instructions) and/or to switch between different interfaces. Any desired form of user interaction with a device can be supported.

Embodiments of the present invention can be realized using any combination of dedicated components and/or programmable processors and/or other programmable devices. The various processes described herein can be implemented on the same processor or different processors in any combination. Accordingly, where components are described as being configured to perform certain operations, such configuration can be accomplished, e.g., by designing electronic circuits to perform the operation, by programming programmable electronic circuits (such as microprocessors) to perform the operation, or any combination thereof Processes can communicate using a variety of techniques including but not limited to conventional techniques for interprocess communication, and different pairs of processes can use different techniques, or the same pair of processes can use different techniques at different times. Further, while the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded and stored on various computer readable storage media; suitable media include magnetic disk or tape, optical storage media such as compact disk (CD) or DVD (digital versatile disk), flash memory, and other non-transitory media. Computer readable media encoded with the program code can be packaged with a compatible electronic device, or the program code can be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method for providing non-visual outputs indicating geographical features to a user, the method performed at an electronic device with one or more sensors and one or more output components, the method comprising:

receiving an input selecting a mode of operation of the electronic device other than a mode for providing directions to a destination location;

while the electronic device is in the selected mode of operation:

determining, using the one or more sensors, a forward direction of motion of the electronic device;

identifying nearby geographical features that the electronic device is moving toward based on the determined forward direction of motion of the electronic device; and providing, via the one or more output components of the electronic device, non-visual outputs that identify the nearby geographical features that the electronic device is moving toward, without providing non-visual outputs that identify nearby geographical features that the electronic device is moving away from.

2. The method of claim 1, wherein the non-visual outputs include a haptic output.

3. The method of claim 1, wherein the non-visual outputs include an audio output.

4. The method of claim 1, wherein the forward direction is based on velocity of the electronic device.

5. The method of claim 1, wherein determining the forward direction of the electronic device includes:

determining a velocity of the electronic device; and in accordance with a determination that the velocity does not exceed a threshold, determining the forward direction based on an orientation of the electronic device.

6. The method of claim 5, wherein the orientation of the electronic device is a direction from a bottom to a top of the electronic device in its normal configuration.

7. The method of claim 1, wherein the forward direction is based on a direction of movement of the electronic device irrespective of an orientation of the electronic device.

8. The method of claim 1, wherein identifying the nearby geographical features includes:

determining a geographic location of the electronic device; and searching for the nearby geographical features near the geographic location of the electronic device.

9. The method of claim 1, wherein identifying the nearby geographical features includes determining a projected location where the electronic device will be after a predetermined time based on a current location of the electronic device and the forward direction.

10. The method of claim 9, wherein the projected location includes a point, a set of locations, a range of locations, or an area.

11. The method of claim 9, further comprising identifying geographical features at the projected location based on a cached map that includes the projected location.

12. The method of claim 9, wherein the projected location includes a location that is a distance from the current location of the electronic device in the forward direction.

13. The method of claim 9, wherein the projected location includes locations within a projected distance range between a minimum projected distance and a maximum projected distance from the current location of the electronic device in the forward direction.

14. The method of claim 9, wherein the projected location includes locations in the forward direction and within an orthogonal distance threshold of the forward direction.

15. The method of claim 9, wherein the projected location includes locations in the forward direction within a projected-location radius from the forward direction.

16. The method of claim 9, wherein the projected location is dynamically determined based on a velocity of the electronic device.

17. The method of claim 9, further comprising automatically expanding the projected location in accordance with a determination that no geographical features are identified near the projected location.

18. The method of claim 1, wherein the electronic device is located in an indoor environment.

19. A non-transitory computer readable storage medium storing one or more programs, the one or more programs comprising instructions that, when executed by an electronic device with one or more sensors and one or more output components, cause the device to:

receive an input selecting a mode of operation of the electronic device other than a mode for providing directions to a destination location;

while the electronic device is in the selected mode of operation:

determine, using the one or more sensors, a forward direction of motion of the electronic device;

identify nearby geographical features that the electronic device is moving toward based on the determined forward direction of motion of the electronic device; and provide, via the one or more output components of the electronic device, non- visual outputs that identify the nearby geographical features that the electronic device is moving toward, without providing non-visual outputs that identify nearby geographical features that the electronic device is moving away from.

20. An electronic device, comprising:

one or more sensors;

one or more output components;

one or more processors;

memory; and one or more programs, wherein the one or more programs are stored in the memory and configured to be executed by the one or more processors, the one or more programs including instructions for:

receiving an input selecting a mode of operation of the electronic device other than a mode for providing directions to a destination location;

while the electronic device is in the selected mode of operation:

determining, using the one or more sensors, a forward direction of motion of the electronic device;

identifying nearby geographical features that the electronic device is moving toward based on the determined forward direction of motion of the electronic device; and providing, via the one or more output components of the electronic device, non-visual outputs that identify the nearby geographical features that the electronic device is moving toward, without providing non-visual outputs that identify nearby geographical features that the electronic device is moving away from.

21. A method for providing non-visual outputs indicating geographical features to a user, the method performed at an electronic device with one or more sensors and one or more output components, the method comprising:

receiving an input selecting a mode of operation of the electronic device other than a mode for providing directions to a destination location;

while the electronic device is in the selected mode of operation:
  determining, using the one or more sensors, a forward direction of the electronic device;
  identifying nearby geographical features; and
  providing, via the one or more output components of the electronic device, non-visual outputs that identify nearby geographical features in only the forward direction.

22. The non-transitory computer readable storage medium of claim 19, wherein the non-visual outputs include a haptic output.

23. The non-transitory computer readable storage medium of claim 19, wherein the non-visual outputs include an audio output.

24. The non-transitory computer readable storage medium of claim 19, wherein the forward direction is based on velocity of the electronic device.

25. The non-transitory computer readable storage medium of claim 19, wherein determining the forward direction of the electronic device includes:
  determining a velocity of the electronic device; and
  in accordance with a determination that the velocity does not exceed a threshold, determining the forward direction based on an orientation of the electronic device.

26. The non-transitory computer readable storage medium of claim 25, wherein the orientation of the electronic device is a direction from a bottom to a top of the electronic device in its normal configuration.

27. The non-transitory computer readable storage medium of claim 19, wherein the forward direction is based on a direction of movement of the electronic device irrespective of an orientation of the electronic device.

28. The non-transitory computer readable storage medium of claim 19, wherein identifying the nearby geographical features includes:
  determining a geographic location of the electronic device; and
  searching for the nearby geographical features near the geographic location of the electronic device.

29. The non-transitory computer readable storage medium of claim 19, wherein identifying the nearby geographical features includes determining a projected location where the electronic device will be after a predetermined time based on a current location of the electronic device and the forward direction.

30. The non-transitory computer readable storage medium of claim 29, wherein the projected location includes a point, a set of locations, a range of locations, or an area.

31. The non-transitory computer readable storage medium of claim 29, wherein the one or more programs further comprise instructions that, when executed by the electronic device, cause the device to identify geographical features at the projected location based on a cached map that includes the projected location.

32. The non-transitory computer readable storage medium of claim 29, wherein the projected location includes a location that is a distance from the current location of the electronic device in the forward direction.

33. The non-transitory computer readable storage medium of claim 29, wherein the projected location includes locations within a projected distance range between a minimum projected distance and a maximum projected distance from the current location of the electronic device in the forward direction.

34. The non-transitory computer readable storage medium of claim 29, wherein the projected location includes locations in the forward direction and within an orthogonal distance threshold of the forward direction.

35. The non-transitory computer readable storage medium of claim 29, wherein the projected location includes locations in the forward direction within a projected-location radius from the forward direction.

36. The non-transitory computer readable storage medium of claim 29, wherein the projected location is dynamically determined based on a velocity of the electronic device.

37. The non-transitory computer readable storage medium of claim 29, wherein the one or more programs further comprise instructions that, when executed by the electronic device, cause the device to automatically expand the projected location in accordance with a determination that no geographical features are identified near the projected location.

38. The non-transitory computer readable storage medium of claim 19, wherein the electronic device is located in an indoor environment.

39. The device of claim 20, wherein the non-visual outputs include a haptic output.

40. The device of claim 20, wherein the non-visual outputs include an audio output.

41. The device of claim 20, wherein the forward direction is based on velocity of the electronic device.

42. The device of claim 20, wherein determining the forward direction of the electronic device includes:
  determining a velocity of the electronic device; and
  in accordance with a determination that the velocity does not exceed a threshold, determining the forward direction based on an orientation of the electronic device.

43. The device of claim 42, wherein the orientation of the electronic device is a direction from a bottom to a top of the electronic device in its normal configuration.

44. The device of claim 20, wherein the forward direction is based on a direction of movement of the electronic device irrespective of an orientation of the electronic device.

45. The device of claim 20, wherein identifying the nearby geographical features includes:
  determining a geographic location of the electronic device; and
  searching for the nearby geographical features near the geographic location of the electronic device.

46. The device of claim 20, wherein identifying the nearby geographical features includes determining a projected location where the electronic device will be after a predetermined time based on a current location of the electronic device and the forward direction.

47. The device of claim 46, wherein the projected location includes a point, a set of locations, a range of locations, or an area.

48. The device of claim 46, wherein the one or more programs further comprise instructions for identifying geographical features at the projected location based on a cached map that includes the projected location.

49. The device of claim 46, wherein the projected location includes a location that is a distance from the current location of the electronic device in the forward direction.

50. The device of claim 46, wherein the projected location includes locations within a projected distance range between a minimum projected distance and a maximum projected distance from the current location of the electronic device in the forward direction.

51. The device of claim 46, wherein the projected location includes locations in the forward direction and within an orthogonal distance threshold of the forward direction.

52. The device of claim 46, wherein the projected location includes locations in the forward direction within a projected-location radius from the forward direction.

53. The device of claim 46, wherein the projected location is dynamically determined based on a velocity of the electronic device.

54. The device of claim 46, wherein the one or more programs further comprise instructions for automatically expanding the projected location in accordance with a determination that no geographical features are identified near the projected location.

55. The device of claim 20, wherein the electronic device is located in an indoor environment.

56. The method of claim 21, wherein the non-visual outputs include a haptic output.

57. The method of claim 21, wherein the non-visual outputs include an audio output.

58. The method of claim 21, wherein the forward direction is based on velocity of the electronic device.

59. The method of claim 21, wherein determining the forward direction of the electronic device includes:
   determining a velocity of the electronic device; and
   in accordance with a determination that the velocity does not exceed a threshold, determining the forward direction based on an orientation of the electronic device.

60. The method of claim 59, wherein the orientation of the electronic device is a direction from a bottom to a top of the electronic device in its normal configuration.

61. The method of claim 21, wherein the forward direction is based on a direction of movement of the electronic device irrespective of an orientation of the electronic device.

62. The method of claim 21, wherein identifying the nearby geographical features includes:
   determining a geographic location of the electronic device; and
   searching for the nearby geographical features near the geographic location of the electronic device.

63. The method of claim 21, further comprising identifying the nearby geographical features in the forward direction by determining a projected location where the electronic device will be after a predetermined time based on a current location of the electronic device and the forward direction.

64. The method of claim 63, wherein the projected location includes a point, a set of locations, a range of locations, or an area.

65. The method of claim 63, further comprising identifying geographical features at the projected location based on a cached map that includes the projected location.

66. The method of claim 63, wherein the projected location includes a location that is a distance from the current location of the electronic device in the forward direction.

67. The method of claim 63, wherein the projected location includes locations within a projected distance range between a minimum projected distance and a maximum projected distance from the current location of the electronic device in the forward direction.

68. The method of claim 63, wherein the projected location includes locations in the forward direction and within an orthogonal distance threshold of the forward direction.

69. The method of claim 63, wherein the projected location includes locations in the forward direction within a projected-location radius from the forward direction.

70. The method of claim 63, wherein the projected location is dynamically determined based on a velocity of the electronic device.

71. The method of claim 63, further comprising automatically expanding the projected location in accordance with a determination that no geographical features are identified near the projected location.

72. The method of claim 21, wherein the electronic device is located in an indoor environment.

* * * * *